United States Patent
Choi et al.

(10) Patent No.: US 9,394,173 B2
(45) Date of Patent: *Jul. 19, 2016

(54) RECOVERY OF PHOSPHORUS VALUES AND SALT IMPURITIES FROM AQUEOUS WASTE STREAMS

(71) Applicant: Monsanto Technology LLC, St. Louis, MO (US)

(72) Inventors: Chil Y. Choi, Chesterfield, MO (US); Gregory A. Hartmann, Kirkwood, MO (US); Peng Lei, St. Louis, MO (US); William Poncez, Kirkwood, MO (US); Peter E. Rogers, Des Peres, MO (US); William A. Scholle, Webster Groves, MO (US); Lowell Smith, Kirkwood, MO (US); Robert B. Weisenfeld, Chesterfield, MO (US); Fuchen Liu, Ballwin, MO (US); Chen-Hsyong Yang, Brentwood, MO (US)

(73) Assignee: Monsanto Technology LLC, St. Louis, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 14/160,116

(22) Filed: Jan. 21, 2014

(65) Prior Publication Data

US 2014/0234196 A1    Aug. 21, 2014

Related U.S. Application Data

(63) Continuation of application No. 13/319,811, filed as application No. PCT/US2010/034696 on May 13, 2010, now Pat. No. 8,669,396.

(60) Provisional application No. 61/179,158, filed on May 18, 2009.

(51) Int. Cl.
*C01B 25/18* (2006.01)
*C02F 1/66* (2006.01)
(Continued)

(52) U.S. Cl.
CPC . *C01B 25/18* (2013.01); *C02F 1/66* (2013.01); *C02F 1/72* (2013.01); *C02F 1/52* (2013.01)

(58) Field of Classification Search
None
See application file for complete search history.

(56) References Cited

U.S. PATENT DOCUMENTS

| 3,072,461 A | 1/1963 | Long et al. |
| 3,595,613 A | 7/1971 | Klingelhoefer |

(Continued)

FOREIGN PATENT DOCUMENTS

| CN | 1446782 A | 10/2003 |
| CN | 1629112 A | 6/2005 |

(Continued)

OTHER PUBLICATIONS

Database Caplus Chemical Abstracts Service, Columbus, Ohio, US; Database Accession No. 2006:504837, Abstract of Xu et al., CN 1775786, May 24, 2006.*

(Continued)

*Primary Examiner* — Karl J Puttlitz
(74) *Attorney, Agent, or Firm* — Senniger Powers LLP; Joseph A. Schaper

(57) ABSTRACT

The present invention generally relates to processes for recovery of phosphorus values and salt impurities from aqueous waste streams. In particular, the present invention relates to processes for recovery of phosphorus values and salt impurities from aqueous waste streams generated in the manufacture of phospho-herbicides, including N-(phosphonomethyl)glycine and glufosinate.

24 Claims, 6 Drawing Sheets

(51) Int. Cl.
  *C02F 1/72* (2006.01)
  *C02F 1/52* (2006.01)

(56) References Cited

U.S. PATENT DOCUMENTS

| | | | |
|---|---|---|---|
| 3,650,686 A * | 3/1972 | Hudson | C01B 25/322 210/724 |
| 3,969,398 A | 7/1976 | Hershman | |
| 3,970,741 A | 7/1976 | Pavonet | |
| 4,134,786 A | 1/1979 | Fletcher et al. | |
| 4,168,963 A | 9/1979 | Rupp et al. | |
| 4,188,366 A | 2/1980 | Houghtaling | |
| 4,201,667 A | 5/1980 | Liao | |
| 4,250,155 A | 2/1981 | Kouloheris et al. | |
| 4,298,583 A | 11/1981 | Davister et al. | |
| 4,314,978 A | 2/1982 | Franklin | |
| 4,486,359 A | 12/1984 | Brendel et al. | |
| 4,582,650 A | 4/1986 | Felthouse | |
| 4,624,937 A | 11/1986 | Chou | |
| 4,696,772 A | 9/1987 | Chou | |
| 4,851,131 A * | 7/1989 | Grabiak et al. | 210/763 |
| 5,087,740 A * | 2/1992 | Smith | 562/17 |
| 5,179,228 A | 1/1993 | Martin Ramon et al. | |
| 5,430,234 A | 7/1995 | Willis et al. | |
| 6,417,133 B1 | 7/2002 | Ebner et al. | |
| 6,548,701 B2 | 4/2003 | Hsu et al. | |
| 6,555,706 B2 | 4/2003 | Berk et al. | |
| 6,586,621 B2 | 7/2003 | Leiber et al. | |
| 6,641,741 B2 | 11/2003 | Phillips | |
| 6,913,742 B2 | 7/2005 | Okajima | |
| 7,015,351 B2 | 3/2006 | Haupfear et al. | |
| 7,129,373 B2 | 10/2006 | Coleman et al. | |
| 7,329,778 B2 | 2/2008 | Morgenstern et al. | |
| 2002/0148786 A1 | 10/2002 | Phillips | |
| 2004/0235664 A1* | 11/2004 | Vandenmersch et al. | 504/206 |
| 2005/0035060 A1* | 2/2005 | Vigil et al. | 210/639 |
| 2008/0178433 A1* | 7/2008 | Rangachari et al. | 23/295 R |

FOREIGN PATENT DOCUMENTS

| | | |
|---|---|---|
| CN | 100333814 C | 8/2007 |
| CN | 101348266 C | 1/2009 |
| CN | 101348299 A | 1/2009 |
| CN | 100465111 C | 3/2009 |
| CN | 101402652 | 4/2009 |
| CN | 101691383 | 4/2010 |
| EP | 0010713 A1 | 5/1980 |
| JP | 9227583 | 9/1997 |
| WO | 0001707 A1 | 1/2000 |
| WO | 0009517 * | 2/2000 |
| WO | 0009517 A2 | 2/2000 |
| WO | 2005016519 A1 | 2/2005 |
| WO | 2006031938 A2 | 3/2006 |
| WO | 2006089193 A2 | 8/2006 |

OTHER PUBLICATIONS

Database Caplus Chemical Abstracts Service, Columbus, Ohio, US; Database Accession No. 1997:63553, Abstract of RD 393056 Research Disclosure (1997), 393, 59, No. 39356.*

Database Caplus Chemical Abstracts Service, Columbus, Ohio, US; Database Accession No. 1986:9833, Abstract of HU 35225. Nagy et al., Alkaloida Vegyeszeti Gyar, Hung, Jun. 28, 1985.*

Alibrahim, M., "Extraction of Phosphoric Acid From Various Aqueous solutions Using Tributyl Phosphate (TBP)," 2007, Chemical Engineering, 51/1:39-42.

Davister, A., et al., "Phosphoric Acid Plant Operations: The Prayon Process for Web Acid Purification," 1982, CEP, 35-39 (6 pages).

Franz, J., et al., "Glyphosate: A Unique global herbicide," 1997, ACS Monograph 189, pp. 233-262.

He, Z-C., et al., "Expanded Scale Test on the Multiple purpose Utilization of the By-Products from Glyphosate Production," 2009, Fine Chemical Intermediates, 39/2:53-55 (9 pages).

International Search Report and Written Opinion issued in PCT/US2010/034696, dated Oct. 28, 2010, 22 pages.

International Preliminary Report on Patentability, PCT/US2010/034696, dated Dec. 1, 2011, 13 pages.

* cited by examiner

RECOVERY OF PHOSPHORUS VALUES AND SALT IMPURITIES FROM AQUEOUS WASTE STREAMS

CROSS-REFERENCE TO RELATED APPLICATIONS

This application is a continuation of U.S. patent application Ser. No. 13/319,811, filed Dec. 22, 2011, which issued Mar. 11, 2014 as U.S. Pat. No. 8,669,396, and which is the U.S. National Stage of International PCT Application No. PCT/US2010/034696, filed May 13, 2010, and claims the benefit of U.S. Provisional Patent Application Ser. No. 61/179,158, filed May 18, 2009, the entire disclosures of which are incorporated herein by reference.

FIELD OF THE INVENTION

The present invention generally relates to processes for recovery of phosphorus values and salt impurities from aqueous waste streams. In particular, the present invention relates to processes for recovery of phosphorus values and salt impurities from aqueous waste streams generated in the manufacture of phospho-herbicides, including N-(phosphonomethyl)glycine and glufosinate.

BACKGROUND OF THE INVENTION

N-(phosphonomethyl)glycine (glyphosate) and its salts are conveniently applied as a component in aqueous, post-emergent herbicide formulations. As such, they are particularly useful as highly effective and commercially important broad-spectrum herbicides for killing or controlling the growth of a wide variety of plants, including germinating seeds, emerging seedlings, maturing and established woody and herbaceous vegetation and aquatic plants.

Various methods for preparation of glyphosate have been developed. One method includes the catalyzed liquid phase oxidative cleavage of a carboxymethyl substituent from an N-(phosphonomethyl)iminodiacetic acid (PMIDA) substrate. Over the years, a wide variety of methods and reactor systems have been disclosed for conducting this oxidation reaction. See generally, Franz, et al., Glyphosate: A Unique Global Herbicide (ACS Monograph 189, 1997) at pp. 233-62 (and references cited therein); Franz, U.S. Pat. No. 3,950,402; Hershman, U.S. Pat. No. 3,969,398; Felthouse, U.S. Pat. No. 4,582,650; Chou, U.S. Pat. No. 4,624,937; Chou, U.S. Pat. No. 4,696,772; Ramon et al., U.S. Pat. No. 5,179,228; Siebenhaar et al., International Publication No. WO 00/01707; Ebner et al., U.S. Pat. No. 6,417,133; Leiber et al., U.S. Pat. No. 6,586,621; and Haupfear et al., U.S. Pat. No. 7,015,351.

The reaction may be conducted in either a batch or continuous oxidation reactor system in the presence of a catalyst that typically comprises particulate carbon, or a noble metal such as platinum on a particulate carbon support. The catalyst is usually slurried in an aqueous solution of PMIDA within a stirred tank reactor, and molecular oxygen is introduced into the reactor to serve as the oxidizing agent. The reaction is exothermic. The liquid phase oxidation of a PMIDA substrate typically produces a reaction mixture containing water and various impurities besides the desired N-(phosphonomethyl)glycine product. These impurities may include, for example, various by-products, unreacted starting materials, as well as impurities present in the starting materials. Representative examples of impurities present in N-(phosphonomethyl)glycine product reaction mixtures include, for example, unreacted PMIDA substrate, N-formyl-N-(phosphonomethyl)glycine (NFG), phosphoric acid, phosphorous acid, N-methyl-N-(phosphonomethyl)glycine (NMG), glycine, aminomethylphosphonic acid (AMPA), methyl aminomethylphosphonic acid (MAMPA), iminodiacetic acid (IDA), imino-bis-(methylene)-bis-phosphonic acid (iminobis), formaldehyde, formic acid, chlorides, and ammonium sulfate.

Other methods for preparation of glyphosate utilize different starting materials including, for example, glycine, which is used in the so-called "alkylphosphite process." See, for example, Chinese Patent Disclosure No. CN 1629112A. Such methods are often referred to elsewhere and herein as the "glycine method" or "glycine route." These methods generally comprise dissolving formaldehyde or paraformaldehyde in a solvent (typically methanol (MeOH)) containing triethylamine followed by addition of glycine. After addition and dissolution of glycine, dimethylphosphite is added, followed by addition of hydrochloric acid (HCl) to produce a mixture of HCl, glyphosate, and methyl chloride. Neutralization by addition of a base provides the glyphosate salt(s). Alternatively, trimethylphosphite may be used as the starting material. Methyl chloride may be recovered and utilized in the manufacture of organosilane products as described, for example, in Chinese Patent Disclosure No. CN 1446782. As with the PMIDA-based method described above, preparation of glyphosate in this manner results in a reaction mixture containing a variety of impurities including, for example, glycine, N,N-bis(phosphonomethyl)glycine (glyphosine), phosphorous acid, phosphoric acid, hydroxymethylphosphonic acid, and triethylamine hydrochloride ($Et_3N.HCl$). Recovery of triethylamine (e.g., using a strong base such as sodium hydroxide (NaOH)) can improve the process economics.

Glyphosate may be produced from glycine, e.g., by a process as described in U.S. Pat. No. 4,486,359, which is expressly incorporated in its entirety herein by reference for all relevant purposes. In this process, glycine is initially reacted with paraformaldehyde in the presence of triethylamine to produce N,N-bis(hydroxymethyl)glycine. The reaction is conducted in a methanol medium, typically at MeOH reflux temperature (i.e., about 65° C.). The N,N-bis (hydroxymethyl)glycine intermediate is reacted with dimethyl phosphite to yield an ester, which U.S. Pat. No. 4,486,359 characterizes as the methyl ester of glyphosate. The ester is hydrolyzed in HCl to glyphosate acid. This product generally has a glyphosine content in excess of 0.010 wt. %, more typically between about 0.05% and about 2% on a glyphosate, a.e., basis. Commercial sources of glycine process glyphosate may commonly contain between about 0.2% and about 1.5% by weight glyphosine and between about 0.05% and about 0.5% by weight glycine, more typically between about 0.3 and about 1% by weight glyphosine and between about 0.1 and about 0.3% by weight glycine, all on a glyphosate, a.e., basis.

In an alternative to the process of U.S. Pat. No. 4,486,359, Japanese Published Application Hei 9-227583 (application no. Hei-9-6881) describes a process in which the reaction between paraformaldehyde and glycine may be conducted in the presence of tributylamine rather than triethylamine, and the ester intermediate may be hydrolyzed in an alkaline medium such as NaOH rather than in acidic medium such as HCl. The Japanese patent publication reports that the base hydrolysis may produce a product of lower glyphosine content than the product of the process of U.S. Pat. No. 4,486,359.

In conducting the process of Japanese Published Application Hei 9-227583, a source of formaldehyde, preferably paraformaldehyde is mixed with a reaction medium comprising $C_1$ to $C_4$ alcohol at moderately elevated temperature, tributylamine is added to the resulting solution and the mixture preferably agitated at about 35° C. to 50° C. for typically 30 to 60 minutes. Glycine is added to the alcohol medium in a proportion which preferably assures a formaldehyde to glycine molar ratio from about 1 to 5, and the glycine is preferably completely dissolved in the medium. Preferably, the molar ratio of tributylamine to glycine is from about 0.5 to about 3. The temperature is maintained at least about 30° C., preferably between about 50° C. and about 60° C. for typically about 10 to 60 minutes, resulting in reaction of glycine with formaldehyde to form the tributylamine salt of N-methylolglycine. A dialkylphosphite, e.g., dimethylphosphite, is then added to the solution under agitation at elevated temperature, preferably at least about 50° C., more typically about 65° C. to about 80° C., conveniently under alcohol reflux, preferably at a molar ratio to N-methylolglycine from about 0.6 to about 2.0. The dialkylphosphite condenses with the tributylamine salt of N-methylolglycine to yield an ester intermediate depicted in the Japanese patent publication as the dialkyl ester of the tributylamine carboxylate salt of glyphosate. Addition of a strong base such as NaOH to this solution saponifies the ester, liberates tributylamine and forms the sodium salt of glyphosate. The reaction mixture separates into two liquid phases, yielding an upper layer containing tributylamine and a lower layer comprising a solution of sodium salt of glyphosate. Tributylamine may be recovered from the upper layer for recycle. The lower layer may be acidified to crystallize glyphosate acid.

The alkaline hydrolysis may be conducted with a strong base comprising a desired countercation such as, e.g., potassium hydroxide (KOH), as a step in the preparation of an aqueous concentrate of the potassium salt of glyphosate. Where the phase separation is carried out under conditions that assure substantially quantitative partition of tributylamine to the upper layer, the lower layer may be used directly in the preparation of an aqueous glyphosate concentrate comprising the potassium salt. Alternatively, the glyphosate salt may be acidified to precipitate glyphosate acid, and the glyphosate acid separated by filtration or centrifugation and washed, and the washed glyphosate wet cake reslurried with water and base to produce the desired salt. In the latter process, the advantage of using KOH for the conversion of intermediate ester to glyphosate salt is diminished. Where triethylamine is used as the alkylamine, it can be quantitatively removed by distillation of the hydrolyzate, which may in certain instances facilitate direct preparation of a concentrate of the glyphosate salt of the base used for the conversion of the intermediate ester. Preferably, the concentrate comprises at least about 360 grams per liter (g/L) glyphosate on an acid equivalent (a.e.) basis.

Regardless of the precise method by which a glyphosate product is manufactured, a concentrated glyphosate product, or wet cake can be prepared from the resulting reaction product solution. Preparation of the glyphosate wet cake also produces a filtrate, or mother liquor that contains various impurities, along with a portion of the glyphosate product not isolated in the wet cake. The glyphosate present in the filtrate, or mother liquor may represent up to 10% (e.g., from 5% to 10%) of the glyphosate produced.

In addition to the above-noted processes (e.g. PMIDA-based and glycine routes), glyphosate product may be manufactured by processes that use AMPA as the substrate. Both glycine and AMPA-based processes generate a profile of byproducts and impurities that is somewhat different from that of the PMIDA oxidation process. For example, the product of the glycine process most typically contains glyphosine in a concentration greater than about 0.010 wt. %, more typically at least about 0.1 wt. %, and most typically in the range of about 0.3 to about 1 wt. %, all on a glyphosate a.e. basis. The product of the AMPA-based process may have a modest to significant fraction of unreacted AMPA, though the product of the PMIDA process can have a comparable AMPA content. The glycine content of the AMPA process product is generally significantly lower than 0.02 wt. % on a glyphosate, a.e., basis.

To capitalize on the glyphosate present in the mother liquor, glyphosate products have been prepared by adding relatively pure glyphosate to the mother liquor to produce a solution of glyphosate containing, for example, approximately 10 wt. % of glyphosate. Unfortunately, however, glyphosate product solutions prepared in this manner typically contain a comparable level of salt (e.g., sodium chloride) along with other impurities associated with the manufacture of glyphosate. Utilizing a glyphosate product containing such high levels of sodium chloride in agricultural applications is undesired for environmental reasons.

Recovery of valuable products from the filtrate, or mother liquor, produced during glyphosate manufacture would improve the overall economics of glyphosate manufacturing processes while avoiding the undesired environmental consequences associated with current practices. More particularly, providing effective recovery of phosphorus and salt values from the filtrate would substantially reduce, and preferably eliminate completely the desirability of preparing glyphosate products of high impurity (e.g., sodium chloride) content directly from the mother liquor.

In addition, commercial processes for manufacture of glyphosate may include deepwell injection of various waste streams, including the mother liquor resulting from wet cake production. Deepwell injection has been and may be practiced in an environmentally responsible manner. However, a method for treatment of waste streams that provides recovery of valuable products as an alternative to deepwell injection would be desirable in the event that deepwell injection of waste streams from glyphosate manufacture is not permitted or commercially practical.

Accordingly, there exists an unfulfilled need in the art for processes for recovery of values from the mother liquor generated in production of glyphosate wet cake and other aqueous waste streams generated in the manufacture of glyphosate, as well as from aqueous process streams generated in the manufacture of glyphosate precursors (e.g. PMIDA).

SUMMARY OF THE INVENTION

Briefly, therefore, the present invention is directed to processes for the recovery of phosphorus values and salt impurities from aqueous waste streams comprising organic phosphorus compounds and salt impurities. In one embodiment, the process comprises oxidizing one or more compounds containing phosphorus and organic carbon present in a feed stream comprising components of the aqueous waste stream to produce a phosphate-containing cake; contacting within an acidification zone the phosphate-containing cake and an acidic liquid medium to form a solution comprising at least one inorganic salt and phosphoric acid; and precipitating salt crystals from the salt-containing solution to form an aqueous product mixture comprising salt crystals and a mother liquor comprising phosphoric acid.

In another embodiment, the process comprises passing a feed stream comprising components of the aqueous waste stream through an atomizing nozzle to form an atomized aqueous waste stream; introducing the atomized aqueous waste stream into a combustion chamber; and combusting one or more compounds containing phosphorus and organic carbon contained in the atomized aqueous waste stream with an oxygen-containing gas at a temperature of from about 600° C. to about 800° C. to form a combustion gas stream comprising carbon dioxide, phosphorus oxide and particulate salt impurities. The process further comprises separating the particulate salt impurities from the combustion gas stream; and contacting the combustion gas stream with an aqueous scrubbing liquid to produce phosphoric acid.

In a further embodiment, the process comprises oxidizing one or more compounds containing phosphorus and organic carbon present in a feed stream comprising components of the aqueous waste stream to produce a phosphate-containing stream and a solid containing inorganic salts; and contacting the phosphate-containing stream with an acidic liquid medium to form phosphoric acid.

The present invention is also directed to processes for recovery of an N-(phosphonomethyl)glycine product from an aqueous process stream further comprising one or more impurities. In one embodiment, the process comprises contacting the aqueous process stream with a selective membrane to produce a retentate comprising N-(phosphonomethyl)glycine and a permeate comprising N-(phosphonomethyl)glycine and one or more impurities. The retentate is enriched in N-(phosphonomethyl)glycine relative to the permeate. The process further comprises introducing the permeate into an ion exchange zone and contacting the permeate with at least one ion exchange resin contained therein for selective removal of N-(phosphonomethyl)glycine therefrom to form an ion exchange zone effluent comprising impurities and depleted in N-(phosphonomethyl)glycine relative to the permeate.

The present invention is also directed to processes for recovery of salt impurities from an aqueous waste stream. In one embodiment the process comprises subjecting the aqueous waste stream to a temperature above the supercritical temperature of the aqueous waste stream and a pressure above the supercritical pressure of the aqueous waste stream.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE PREFERRED EMBODIMENTS

Figure 1:
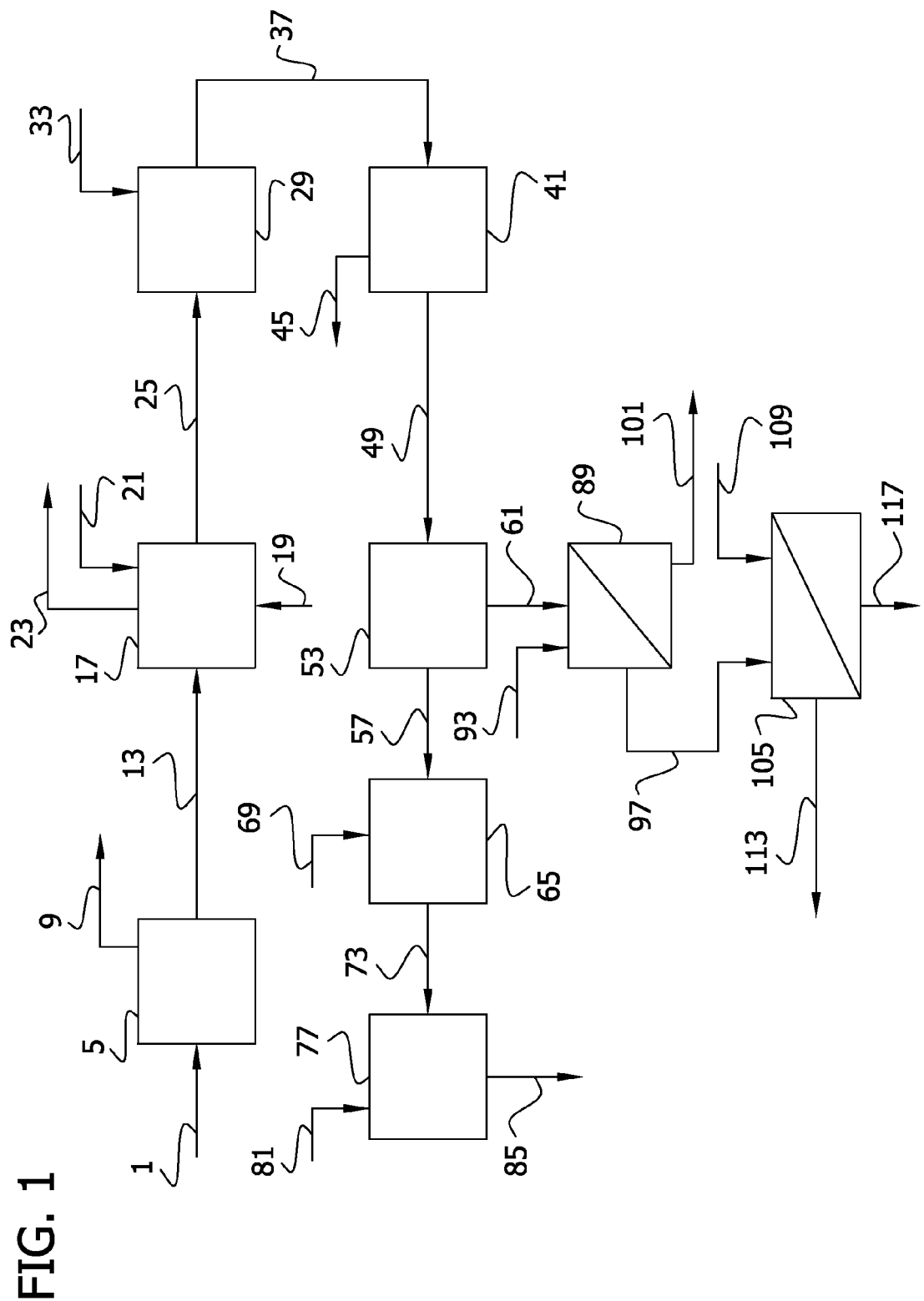
FIG. 1 is a flowsheet depicting one embodiment of a process for recovery of phosphorus values and salt impurities from an aqueous waste stream generated in glyphosate manufacture.

Described herein are processes for recovery of phosphorus values and salt impurities from aqueous waste streams comprising phosphorus compounds (e.g., inorganic and organic phosphorus compounds) and one or more salt impurities. Processes of the present invention are suitable for recovery of phosphorus values and salt impurities from a variety of aqueous waste streams, including aqueous waste streams generated in the manufacture of phospho-herbicides. For example, described herein are processes for recovery of phosphorus values and salt impurities from aqueous waste streams generated in the manufacture of glyphosate and glufosinate. Similarly, the processes of the present invention are also suitable for recovery of phosphorus values and salt impurities from aqueous process streams generated in the manufacture of precursors of phospho-herbicides such as glyphosate. For example, various embodiments of the present invention are directed to recovery of phosphorus values and salt impurities from aqueous waste streams comprising the glyphosate precursor PMIDA.

Much of the following discussion focuses on processes for recovery of phosphorus values and salt impurities from aqueous waste streams generated in the manufacture of glyphosate, but it is to be understood that the processes detailed herein may be readily adapted to recovery of phosphorus values and salt impurities from various other waste streams comprising various organic phosphorus compounds and salt impurities.

In commercial practice, the PMIDA-based route of glyphosate manufacture typically produces aqueous waste streams (e.g., mother liquor generated in glyphosate wet cake production) containing up to approximately 2 wt. % glyphosate, up to approximately 10 wt. % sodium chloride, various phosphonic acids, ammonium sulfate, and various other impurities. Similarly, the glycine route for glyphosate manufacture produces aqueous waste streams of similar glyphosate and sodium chloride content, along with glyphosine, glycine, phosphorous acid, phosphoric acid, hydroxymethylphosphonic acid, and various other impurities.

Recovery of inorganic salts (e.g., sodium chloride) and phosphorus values (e.g., phosphoric acid) from these waste streams provides value in view of the recovery of these products. In addition, these recovery processes represent an economically viable alternative to utilizing the waste streams to prepare glyphosate products having high impurity content. These recovery processes also provide alternatives to discharge of these waste streams into surface waters or deepwells.

Also described herein are processes for recovery of glyphosate from aqueous waste streams generated in the manufacture thereof. As noted, glyphosate present in these waste streams may represent up to approximately 5 to 10% by weight of the total glyphosate produced. Accordingly, in addition to recovery of phosphorus and salt values, recovery of glyphosate from the waste stream improves the overall economics of the process. Recovery of glyphosate may be carried out utilizing a variety of methods including, for example, evaporative crystallization, membrane separation and ion exchange techniques. Similarly, also described herein are processes for recovery of one or more glyphosate precursors (e.g., PMIDA), along with recovery of phosphorus values and salt impurities. Glyphosate precursors such as PMIDA and precursors of PMIDA recovered in accordance with the processes of the present invention may be utilized in preparation of glyphosate.

It is to be understood that reference to "phosphorus values" refers to phosphorus recovered from the waste stream, regardless of the source of the phosphorus. For example, recovered phosphorus values may be derived from organic phosphorus compounds (e.g., glyphosate, PMIDA, aminomethylphosphonic acid, hydroxymethylphosphonic acid, N-formyl-N-(phosphonomethyl)glycine, N-methyl-N-(phosphonomethyl)glycine, methyl aminomethylphosphonic acid and salts thereof), and may also be provided by other components of the aqueous waste stream (e.g., phosphoric acid, phosphorous acid, and salts thereof). Typically, as detailed elsewhere herein, phosphorus values are recovered in the form of phosphoric acid.

A. Recovery of Phosphoric Acid and Sodium Chloride

Various embodiments of the processes of the present invention comprise oxidizing one or more compounds containing phosphorus and organic carbon present in a feed stream comprising components of the aqueous waste stream. As detailed elsewhere herein, oxidation of these components of the waste stream may be conducted by calcination of the aqueous waste stream and/or combustion of components of the aqueous waste stream.

The organic carbon and phosphorus to be oxidized may be present in one or more components of the aqueous feed stream. For example, in the case of an aqueous waste stream generated in the PMIDA-based route of glyphosate manufacture, organic carbon may be present in glyphosate, PMIDA, and various by-products of PMIDA oxidation, including formic acid, formaldehyde, and various other impurities. Phosphorus to be oxidized in such waste streams is typically present in glyphosate, unreacted PMIDA substrate, N-formyl-N-(phosphonomethyl)glycine, NMG, phosphoric acid, phosphorous acid, AMPA, and MAMPA. In the case of aqueous waste streams generated in the glycine-based route of glyphosate manufacture, organic carbon may be present in glycine, glyphosate, glyphosine, NMG, hydroxymethylphosphonic acid, AMPA, and MAMPA. Phosphorus to be oxidized in glycine-based route waste streams may be present in glyphosate, glyphosine, phosphorous acid, phosphoric acid, and hydroxymethylphosphonic acid.

Generally, oxidizing compounds containing phosphorus and organic carbon produces a phosphate-containing cake that is contacted with an acidic liquid medium to form a solution comprising at least one inorganic salt (e.g., sodium chloride) and phosphoric acid. Salt crystals are typically precipitated from the salt-containing solution to form an aqueous product mixture comprising salt crystals and a mother liquor comprising phosphoric acid.

Further in accordance with the present invention, the process typically comprises separating salt crystals and the phosphoric acid-containing mother liquor. The salt crystal fraction may be washed to produce a purified salt product exhibiting one or more desired properties (e.g., total organic carbon (TOC) content, total nitrogen content, and/or total phosphate content, as specified elsewhere herein). Additionally or alternatively, the salt product is typically dissolved in an aqueous medium to form a brine solution. Also in accordance with the present invention, and as detailed elsewhere herein, phosphoric acid is typically extracted from the mother liquor fraction by suitable methods, including liquid-liquid extraction.

FIG. 1 depicts one embodiment of a process for recovering phosphorus values and salt impurities from an aqueous waste stream generated in the manufacture of glyphosate. It is to be understood that the process depicted in FIG. 1 is not limited to recovery of phosphorus values and salt impurities from aqueous waste streams generated in the manufacture of glyphosate, and is generally suitable for recovery of phosphorus values and salt impurities from a variety of aqueous waste streams emanating from the manufacture of phospho-herbicides.

As shown, feed stream 1 comprising components of the aqueous waste stream is introduced into a concentration vessel, or evaporator 5 to remove water and one or more other impurities in overheads stream 9. Various conventional methods for the manufacture of glyphosate generate aqueous waste streams comprising organic impurities including formaldehyde and formic acid. As shown in FIG. 1, concentration of feed stream 1 removes water, formaldehyde, and formic acid in overheads stream 9.

It is to be understood that removal of water and one or more organic impurities from feed stream 1 is not limited to evaporation or concentration and may suitably be conducted by various other means. For example, in various embodiments, water and one or more organic impurities are removed from the waste stream by contacting the waste stream with a separation membrane to form a retentate comprising organic phosphorus compounds and a permeate comprising water and one or more organic impurities. More particularly, treatment of the waste stream (i.e., feed) by membrane separation forms a retentate enriched in organic phosphorus compounds and salt impurities relative to the permeate and the feed stream comprises at least a portion of the retentate. These organic phosphorus compounds typically include, for example, N-formyl-N-(phosphonomethyl)glycine, N-methyl-N-(phosphonomethyl)glycine, aminomethylphosphonic acid, methyl aminomethylphosphonic acid, iminodiacetic acid, and combinations thereof. The permeate typically contains various organic impurities (e.g., formic acid and/or formaldehyde).

Again with reference to FIG. 1, evaporation, or concentration of waste stream 1 provides an aqueous waste slurry 13 that is introduced into a vessel 17 suitable for heating of the slurry for oxidation of organic carbon and phosphorus-containing species (e.g., to form phosphate and pyrophosphate species).

Although shown in FIG. 1, it is to be understood that concentration of feed stream 1 is not required for operation of the processes of the present invention. Thus, in various embodiments, feed stream 1 is introduced directly to vessel 17 for oxidation of one or more compounds containing organic carbon and phosphorus. However, concentration of feed stream 1 is generally preferred as concentration of the feed stream reduces energy requirements during and simplifies subsequent processing (e.g., oxidation of phosphorus and organic carbon). Thus, concentration of at least a portion of the aqueous feed stream is generally preferred in connection with commercial-scale recovery processes.

Generally in accordance with the present invention, and in accordance with the embodiment depicted in FIG. 1, vessel 17 is a suitable apparatus for calcination of aqueous waste slurry 13 or combustion of components of the aqueous waste slurry 13. The precise configuration of vessel 17 is not narrowly critical and may be readily selected by one skilled in the art.

For example, in various preferred embodiments, vessel 17 is in the form of a rotary kiln, or calciner. Calcination of aqueous waste slurry 13 generally proceeds by contacting the vessel, or calciner with a heat source 19 for heating of the aqueous waste slurry therein and, as shown in FIG. 1, introducing gas stream 21 into vessel 17. Generally, gas stream 21 comprises an oxygen-containing gas (e.g., air) and, additionally or alternatively, may comprise a fuel such as, for example, propane or natural gas.

In various other embodiments, gas stream 21 is introduced into vessel 17 for oxidizing one or more compounds containing phosphorus and organic carbon in the absence of direct heating of vessel 17. Thus, in such embodiments, oxidation of the components of the aqueous waste slurry proceeds via combustion of the components of the feed stream in the absence of calcination of the slurry by direct heating of vessel 17.

Regardless of the precise manner of operation, heating or combusting components of the aqueous feed stream or slurry removes various organic impurities from the feed stream including, for example, in overheads stream 23.

Oxidizing one or more compounds containing phosphorus and organic carbon in vessel 17 produces a phosphate-containing cake 25 that is introduced into an acidification zone within an acidification vessel 29 into which an acidic liquid medium 33 is also introduced. Typically, the acidic liquid medium comprises an acid (e.g. hydrochloric acid) at a concentration of at least about 10 wt. %, more typically at least about 20 wt. % and, still more typically, at least about 35 wt. %.

Contacting phosphate-containing cake 25 with the acidic liquid medium 33 within the acidification zone produces a solution 37 comprising at least one inorganic salt and phosphoric acid. In various embodiments, the solution formed in the acidification zone comprises sodium chloride.

Solution 37 produced in the acidification zone is introduced into a concentration vessel 41 for removal of water 45 and precipitation of salt crystals from the solution. Precipitation of salt crystals within vessel 41 forms an aqueous product mixture 49 comprising the salt crystals and a mother liquor comprising phosphoric acid. Precipitation of salt crystals generally comprises removal of water from solution 37 by, for example, heating the product mixture. More particularly, removal of water from solution 37 typically comprises heating the solution to temperatures in excess of at least about 50° C., or at least about 80° C.

Aqueous product mixture 49 is introduced into separator 53 for separation of the aqueous product mixture into a salt crystal fraction 57 and an aqueous mother liquor fraction 61. Separation of the salt crystals and phosphoric acid-containing mother liquor of aqueous product mixture 49 generally proceeds in accordance with suitable solids-liquid separation methods known in the art including, for example, centrifugation.

The salt crystals thus produced are generally suitable for use in a variety of applications (e.g., chloro-alkali processes). Certain applications may require a salt product of certain minimum purity as determined by one or more properties of the salt product including, for example, TOC content, total nitrogen content, and/or total phosphate content. Again with reference to FIG. 1, salt product crystals 57 are optionally introduced into washing vessel 65 into which is also introduced a suitable washing medium 69 to produce a purified salt-containing product 73. Typically, the washing medium is water, or brine water and the salt crystals are washed via counter-current flow of the crystals and washing medium within washing vessel 65. The precise composition of the washing medium and the manner of washing of the salt crystals are not narrowly critical and may be readily selected by one skilled in the art.

Although shown in FIG. 1, it is to be understood that washing of the salt crystals is not required in accordance with the processes of the present invention. That is, though a washing operation is typically utilized, suitable salt products may be provided in the absence of a washing operation. Regardless of any washing operation, preferably the salt product (e.g., purified salt-containing product) exhibits one or more properties. For example, in various preferred embodiments, the salt product generally exhibits a TOC content of no more than about 50 ppm, or no more than about 40 ppm, typically no more than about 30 ppm, more typically no more than about 20 ppm and, still more typically, no more than about 10 ppm. Additionally or alternatively, the salt product generally exhibits a total nitrogen content of no more than about 50 ppm, or no more than about 35 ppm, typically no than about 18 ppm and, still more typically, no more than about 10 ppm. Further in accordance with the present invention, the salt product generally exhibits a total phosphate content of no more than about 500 ppm, typically no more than about 380 ppm, more typically no more than about 250 ppm and, still more typically, no more than about 100 ppm.

Again with reference to FIG. 1, purified salt-containing product 73 may optionally be introduced into vessel 77 and combined with aqueous medium 81 also introduced into vessel 73 to produce a brine solution 85. Generally, the brine solution exhibits a total solids/salt content of at least about 5 wt. %, at least about 10 wt. %, or at least about 20 wt. %. Typically, the total solids/salt content of the brine solution is from about 5 to about 45 wt. %, more typically from about 10 to about 35 wt. % and, still more typically, from about 20 to about 30 wt. %. Brine solution produced in accordance with the processes of the present invention is suitable for use in a variety of applications including, for example, in chloro-alkali processes for conversion of sodium chloride to sodium hydroxide and chlorine.

Further in accordance with the present invention, phosphoric acid is recovered from aqueous mother liquor fraction 61. As shown in FIG. 1, mother liquor fraction 61 is introduced into an extraction zone within an extraction vessel 89 and contacted and mixed with an extraction solvent 93. The composition of the extraction solvent is not narrowly critical. Typically, however, the extraction solvent is an organic solvent comprising, for example, tributyl phosphate, diisopropyl ether, and combinations thereof. In various embodiments, the organic solvent contains from about 10 wt. % to about 20 wt. % tributyl phosphate and from about 80 wt. % to about 90 wt. % diisopropyl ether. In accordance with these and various other embodiments, the mass ratio of the organic solvent to the mother liquor fraction in the extraction zone is generally from about 1:1 to about 5:1, or from about 2:1 to about 3:1. Mixing the mother liquor fraction and organic solvent forms an extraction mixture comprising an organic extract comprising phosphoric acid and an aqueous raffinate depleted in phosphoric acid relative to the mother liquor fraction. The organic extract 97 is separated from the aqueous raffinate 101. Although not shown in FIG. 1, at least a portion of aqueous raffinate 101 may be introduced into acidification vessel 29.

In this manner, an organic extract 97 comprising a substantial portion of the phosphoric acid of the mother liquor fraction is formed. More particularly, in accordance with the present invention, the organic extract typically comprises at least about 5 wt. %, more typically at least about 10 wt. %, and preferably at least about 15 wt. % of the phosphoric acid contained in the mother liquor fraction.

Additionally or alternatively, it is to be understood that recovery of phosphorus values can be indicated by the phosphate ion concentration of the mother liquor fraction. More particularly, in various embodiments the phosphate ion content of the mother liquor fraction and/or organic extract comprising phosphoric acid represents a phosphate recovery of at least about 10 wt. %, more typically of at least about 20 wt. %, and still more typically of at least about 30 wt. %.

The precise configuration of extraction vessel 89 is not narrowly critical, but is typically selected to be suitable for countercurrent, liquid-liquid extraction for recovery of phosphoric acid from mother liquor fraction 61.

Again with reference to FIG. 1, organic extract 97 comprising phosphoric acid is introduced into a stripping zone within a stripping vessel 105 along with an aqueous medium 109 to form a mixture (e.g., stripping zone extraction mixture) comprising an aqueous extract comprising phosphoric acid and an organic raffinate depleted in phosphoric acid. The organic raffinate depleted in phosphoric acid 113 is separated from aqueous extract 117. Although not shown in FIG. 1, at least a portion of organic raffinate 113 may be introduced into extraction vessel 89.

In various embodiments, the aqueous, solids-depleted mother liquor fraction 61 may comprise one or more metallic impurities selected from the group consisting of arsenic, copper, zinc, iron, nickel, manganese, aluminum, chromium, and combinations thereof. Although not shown in FIG. 1, in various embodiments one or more metallic impurities may be removed from aqueous mother liquor fraction 61 prior to its introduction into extraction vessel 89.

One suitable method for removal of metallic impurities from the aqueous, solids-depleted mother liquor fraction comprises ion exchange. In accordance with various embodiments, the solids-depleted mother liquor fraction is contacted with an ion exchange resin selective for removal of one or more metallic impurities therefrom to form a solids-depleted mother liquor fraction having a reduced concentration of the one or more metallic impurities. Contact of the mother liquor fraction with the ion exchange resin generally comprises passing the mother liquor fraction through a bed of ion exchange resin within a suitable vessel. The precise configuration of the ion exchange resin and vessel are not narrowly critical and may readily be selected by one skilled in the art. Suitable ion exchange resins include, for example and without limitation, Amberlite IRA-120 resin manufactured by Rohm and Haas, (Philadelphia, Pa.) and Dowex IDA-1 (Iminodiacetic acid) resins available from the Dow Chemical Company (Midland, Mich.).

Additionally or alternatively, removal of metallic impurities from the aqueous, solids-depleted mother liquor fraction may comprise introducing a source of sulfide anions (e.g. hydrogen sulfide or sodium hydrosulfide) into the mother liquor fraction to form an insoluble metal sulfide fraction comprising one or more metal sulfides (e.g., arsenic and/or copper sulfide). The insoluble metal sulfide fraction is separated from the solids-depleted mother liquor fraction to form a solids-depleted mother liquor fraction having a reduced concentration of one or more metallic impurities for further processing (e.g., liquid-liquid extraction) and recovery of phosphoric acid therefrom. The manner of contact of the mother liquor fraction with the source of sulfide anions is not narrowly critical and a suitable vessel and configuration may be readily selected by one skilled in the art. The precise composition of the source of sulfide anions is likewise not narrowly critical and may be readily selected by one skilled in the art depending, for example, on the composition of the mother liquor fraction, the metals to be removed, and the desired metal impurity content specification.

Figure 2:
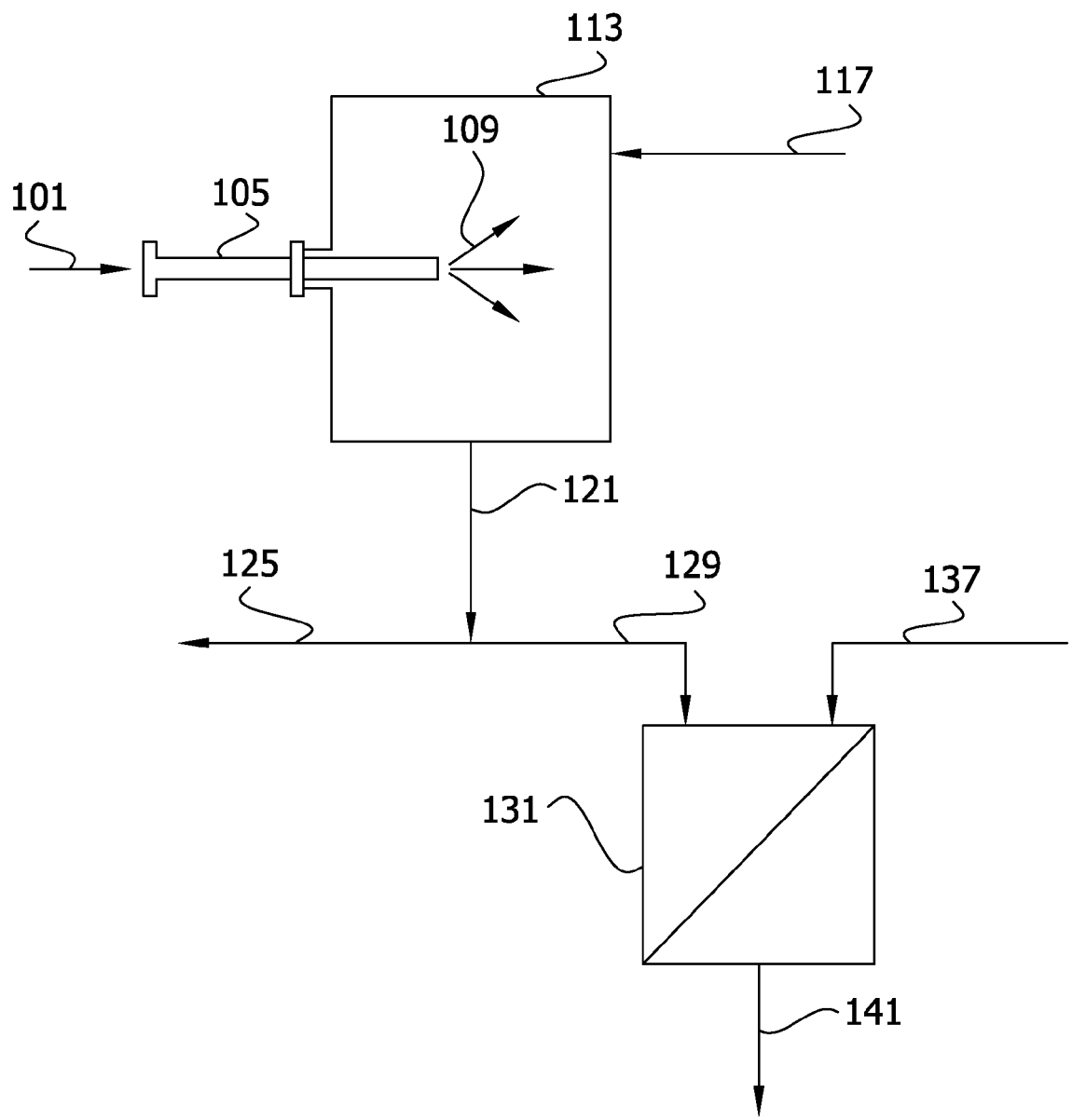
FIG. 2 is a flowsheet depicting another embodiment of a process for recovery of phosphorus values and salt impurities from an aqueous waste stream generated in glyphosate manufacture.

FIG. 2 depicts another embodiment of a recovery process of the present invention utilizing direct combustion to oxidize organic carbon and phosphorus-containing components of the aqueous waste stream. Feed stream 101 comprising components of the aqueous waste stream is introduced into and passed through atomizing nozzle 105 to form an atomized aqueous waste stream 109 that is discharged into a combustion chamber 113.

Organic carbon and phosphorus-containing impurities contained in the atomized aqueous waste stream 109 are combusted along with a fuel source 117 in the presence of oxygen to form a combustion gas stream 121 comprising carbon dioxide, phosphorus oxide and particulate salt impurities. Typically, the combustion or flame temperature within combustion chamber 113 is maintained at about 500° C. or higher, more typically at least about 600° C. and, still more typically, at least about 700° C. Preferably, the combustion or flame temperature is maintained at from about 500° C. to about 1000° C., and more preferably from about 700° C. to about 900° C. or from about 600° C. to about 800° C.

Particulate salt impurities 125 are separated from the combustion gas stream 121 and the combustion gas stream depleted in particulate salt impurities 129 is introduced into a scrubbing vessel 131. An aqueous scrubbing liquid 137 is also introduced into scrubbing vessel 131 to produce a stream of phosphoric acid 141.

In accordance with the embodiment depicted in FIG. 2, particulate salt impurities may satisfy, or may be further processed as detailed elsewhere herein (e.g., by washing) to exhibit one or more of the above-noted properties of TOC content, total nitrogen content, and/or total phosphate content. In addition, particulate salt impurities may be incorporated into brine solutions as described elsewhere herein.

B. Recovery of Glyphosate

As noted, processes of the present invention are suitable for recovery of phosphorus values and salt impurities from aqueous waste streams generated in the manufacture of glyphosate and other phospho-herbicides. To aid in recovery of these components and improve overall economics glyphosate or other valuable components are recovered from the feed stream comprising components of the aqueous waste stream prior to recovery of phosphorus values and salt impurities by one or more membrane separation and/or ion exchange operations.

Figure 3:
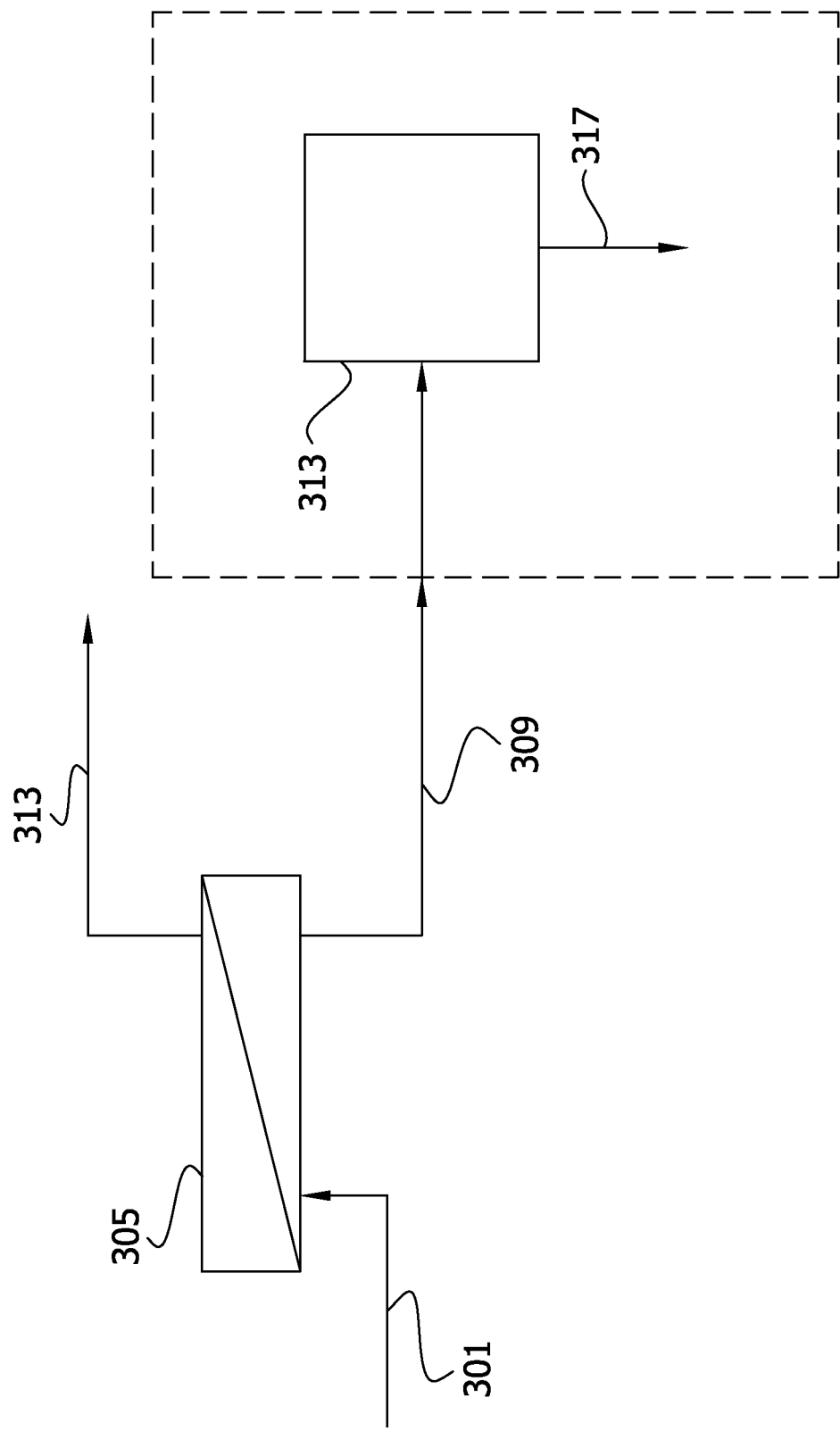
FIG. 3 is a flowsheet depicting one embodiment of a process for recovery of glyphosate from an aqueous waste stream.

FIG. 3 depicts one embodiment of a process for recovery of glyphosate that may be utilized in conjunction with the phosphorus value—salt impurity recovery processes detailed elsewhere herein. As shown, an aqueous process stream 301 is introduced into a membrane separation unit 305 containing a suitable separation membrane. Contacting the aqueous process stream 301 with the separation membrane forms a retentate 309 and a permeate 313. The retentate comprises glyphosate or a salt thereof and, more particularly, is typically enriched in glyphosate relative to the permeate and may be concentrated and recovered as product. Further in accordance with such embodiments, the feed stream (e.g., feed streams 1 and 101 shown in FIGS. 1 and 2, respectively) comprises at least a portion of the permeate.

Although not shown in FIG. 3, an optional dilution/diafiltration stream may be introduced into membrane separation unit 305 such that the membrane operates as a diafiltration membrane. Additionally or alternatively, aqueous process stream 301 may be diluted by combination with a suitable aqueous medium prior to introduction into membrane separation unit 305 such that the separation membrane operates as a diafiltration membrane.

Generally, in accordance with the present invention, any of a variety of membrane separation techniques well-known in the art may be utilized including, for example, ultrafiltration, microfiltration, nanofiltration, and reverse osmosis. However, in various preferred embodiments, the process of the present invention utilizes nanofiltration.

The membrane separation unit 305 may be configured as either a single pass or multi-pass system and may comprise one or more ultrafiltration, microfiltration, nanofiltration and/or reverse osmosis membranes or modules. The membrane modules may be of various geometries and include flat (plate), tubular, capillary or spiral-wound membrane elements and the membranes may be of mono- or multilayer construction. In some embodiments, tubular membrane modules may allow a higher solids content in the mother liquor solution to be treated such that solids reduction upstream of the membrane separation unit is not required.

In order to adequately withstand the often relatively low pH conditions prevailing in the solids-depleted mother liquor fraction fed to the membrane separation unit, the separation membranes and other components (e.g., support structure) of the membrane modules are preferably constructed of suitably acid-resistant materials.

Suitable nanofiltration separation membranes are typically constructed of organic polymers such as crosslinked aromatic polyamides in the form of one or more thin film composites. Generally, suitable nanofiltration membranes exhibit a Molecular Weight Cut Off (MWCO) of from about 150 daltons to about 1000 daltons and, typically, of about 250 daltons. In addition to the size (e.g., largest dimension) of process stream components or constituents, separation by suitable nanofiltration membranes also typically includes a component based on the charge of the membrane, which depends, at least in part, on the pH of the process stream contacted with the membrane. Examples of suitable nanofiltration membranes include, for example and without limitation, the Desal membranes (e.g., Desal-5 DK and Desal KH) available from GE Osmonics Incorporated, a subsidiary of GE Infrastructure (Minnetonka, Minn.), the NF membranes (e.g., NF 40, NF 40HF, NF 50, NF 70, and NF 270) available from FilmTec Corporation, a subsidiary of the Dow Chemical Company (Midland, Mich.), MPS-34 membrane available from Koch Membranes (Wilmington, Mass.), SU 600 membrane available from Toray (Japan), and the NTR membranes (e.g. NTR 7450 and NTR 7250) available from Nitto Electric (Japan). Suitable reverse osmosis membranes include, for example and without limitation, SE-type reverse osmosis membranes available from GE Osmonics Incorporated (Minnetonka, Minn.) and SW30 reverse osmosis membranes available from FilmTec Corporation.

Suitable nanofiltration membranes typically exhibit the following rejection characteristics with respect to chloride ions and glyphosate, as determined from compositional data for the initial process stream and resulting retentate and permeate. These compositional data may be determined by methods known in the art including, for example, high performance liquid chromatography (HPLC) and mass spectrometry analysis. A rejection characteristic may be defined as the difference between one and the ratio of permeate concentration (Cp) of a component to the average of the process stream concentration (Cs) and retentate concentration (Cr) of the component: $1-Cp/((Cs+Cr)/2)$. Suitable nanofiltration membranes generally exhibit a rejection characteristic with respect to chloride ions of from about 30% to about 100%, typically from about 40% to about 80% and, more typically, of about 40% to about 50%. The glyphosate rejection characteristic of suitable nanofiltration membranes is generally from about 75% to about 100%, typically from about 90% to about 98% and, more typically, about 95%.

Nanofiltration and reverse osmosis are pressure-driven separation processes driven by the difference between the operating pressure and the osmotic pressure of the solution on the feed or retentate side of the membrane. The operating pressure in the membrane separation unit 305 will vary depending upon the type of membrane employed, as osmotic pressure is dependent upon the level of transmission of solutes through the membrane. Operating pressures in membrane separation unit 305 are suitably achieved by passing the incoming aqueous process stream 301 through one or more pumps (not shown) upstream of the membrane unit, for example, a combination booster pump and high-pressure pump arrangement. Generally, nanofiltration operations exhibit lower osmotic pressures than reverse osmosis operations, given the same feed solution. For the membranes that were tested, the osmotic pressure for nanofiltration of glyphosate product mother liquor solutions was typically from about 3000 kilopascals (kPa) absolute to about 6500 kPa absolute and more typically from about 3000 kPa to about 5500 kPa. The operating pressure necessary to achieve adequate water removal in permeate 313 is significantly lower in the case of nanofiltration membranes as compared to reverse osmosis membranes. The driving force for transmission of water through the membrane (i.e., permeate flux) increases with the operating pressure. However, the benefits of increased operating pressure must be weighed against the increased energy requirements (e.g. energy required for pumping) and the detrimental effects on membrane life (i.e., compaction).

In order to maintain or enhance membrane separation efficiency and permeate flux, the membranes should be periodically cleaned so as to remove contaminants from the surface of the membrane. Suitable cleaning includes cleaning-in-place (CIP) operations wherein the surface of the membrane is exposed to a cleaning solution while installed within membrane separation unit 305. Preferred systems monitor the conductivity of permeate 313 as conductivity can be correlated to the concentration of N-(phosphonomethyl)glycine product and other components that pass through the membrane. An increase in conductivity in the permeate may indicate an increase in transmission of the N-(phosphonomethyl)glycine product through the membrane and can be used to signal the need for cleaning operations. Additionally, a fall in permeate flow with all other factors remaining constant may indicate fouling and the need for cleaning operations.

Cleaning protocols and cleaning solutions will vary depending on the type of separation membrane employed and are generally available from the membrane manufacturer. Suitable cleaning solutions may include, for example, caustic or alkaline solutions. For example, in the case of polyamide thin-film based reverse osmosis membranes, suitable cleaning solutions may include membrane cleaners available from GE Betz, Inc., a subsidiary of GE Infrastructure (Trevose, Pa.), such as (1) an alkaline, water-soluble surfactant-containing membrane cleaner that removes organic foulants and comprising diethanolamine, the trisodium salt of nitrilotriacetic acid, the trisodium salt of N-hydroxyethylenediamine triacetic acid, triethanolamine, monoethanolamine and sulfonated sodium salts of 1,1'-oxybis, tetrapropylene benzene derivatives; and/or (2) an alkaline chelating agent-containing membrane cleaner comprising trisodium phosphate (sodium phosphate, tribasic), the disodium salt of silicic acid (sodium metasilicate), sodium carbonate and sodium dodecylbenzenesulfonate. In order to not damage the membranes and unnecessarily shorten membrane life, the CIP operation is preferably conducted using a solution of a standard pH at pressure and temperature conditions known to those skilled in the art. In some applications, it may be advantageous to conduct a cleaning operation on new separation membranes prior to use in the membrane separation operation in order to improve membrane performance.

Again with reference to FIG. 3, retentate 309 may optionally (as denoted by the dashed lines in FIG. 3) be introduced into an ion exchange column or unit 313 containing an ion exchange zone comprising a bed of ion exchange resin. Retentate 309 is contacted with at least one ion exchange resin contained therein for selective removal of glyphosate to form an ion exchange zone effluent 317 depleted in glyphosate relative to the retentate. Further in accordance with such embodiments, the feed stream (e.g., feed streams 1 and 101 shown in FIGS. 1 and 2, respectively) may comprise at least a portion of the ion exchange zone effluent. For example, a feed stream comprising at least a portion of the ion exchange effluent may be introduced into concentration vessel 5 shown in FIG. 1, or may be introduced directly into vessel 17 for oxidation of one or more compounds containing organic carbon and phosphorus. Once the adsorption capacity of the ion exchange resin is diminished (e.g., as determined by breakthrough of glyphosate), the bed may be regenerated by means known in the art to desorb glyphosate product. Further in this regard, it is to be noted that in connection with aqueous waste streams from manufacture of glyphosate by the glycine process, ion exchange may be utilized to remove hydroxymethylphosphonic acid (HMPA) from the waste stream to form a feed stream for the phosphorus value—salt impurity recovery processes of the present invention.

Figure 4:
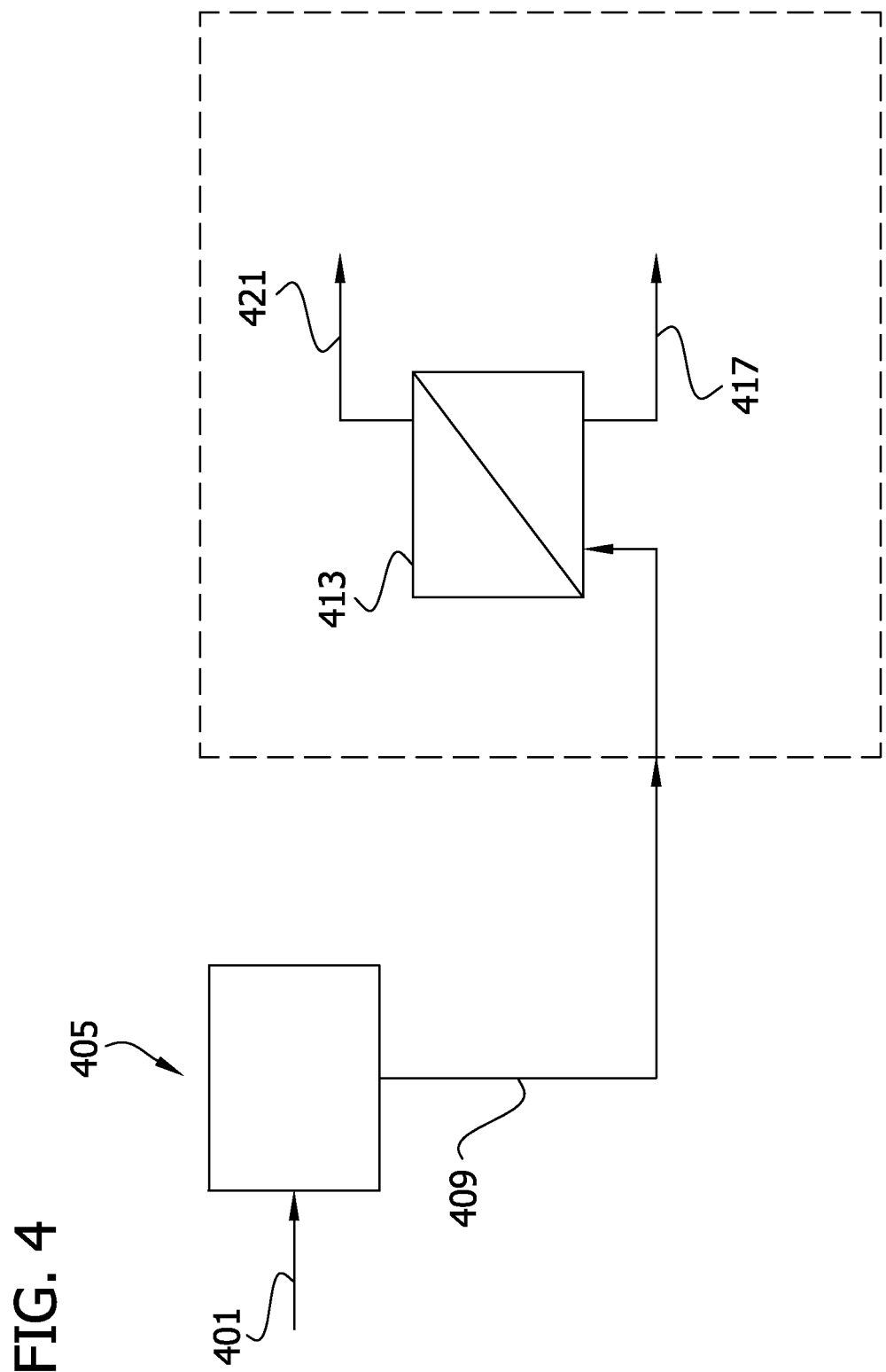
FIG. 4 is a flowsheet depicting another embodiment of a process for recovery of glyphosate from an aqueous waste stream.

Further in accordance with the present invention and with reference to FIG. 4, glyphosate may be recovered from an aqueous process stream by a process comprising at least one ion exchange operation followed by at least one membrane separation operation. As shown in FIG. 4, aqueous process stream 401 is introduced into an ion exchange unit 405 containing an ion exchange zone comprising a bed of ion exchange resin for selective removal of glyphosate and/or one or more impurities (e.g., HMPA). Waste stream 401 is contacted with the ion exchange resin to form an ion exchange zone effluent 409 comprising components of the aqueous waste stream and depleted in glyphosate relative to the waste stream. In accordance with such embodiments, typically the feed stream of the phosphorus value—salt impurity recovery process (e.g., feed streams 1 and 101 shown in FIGS. 1 and 2, respectively) may comprise at least a portion of the ion exchange zone effluent 409. The bed may likewise be regenerated by means known in the art to desorb glyphosate product.

Also in accordance with the embodiment depicted in FIG. 4, ion exchange effluent 409 is optionally (as depicted by dashed lines) introduced into a membrane separation unit 413 and contacted with at least one separation membrane to form a retentate 417 and a permeate 421. Retentate 417 comprises glyphosate or a salt thereof and is enriched in glyphosate relative to the permeate and may be concentrated and recovered as product. In accordance with such embodiments, the feed stream of the phosphorus value—salt impurity recovery process (e.g., feed streams 1 and 101 shown in FIGS. 1 and 2, respectively) may comprise at least a portion of the permeate 421.

Figure 5:
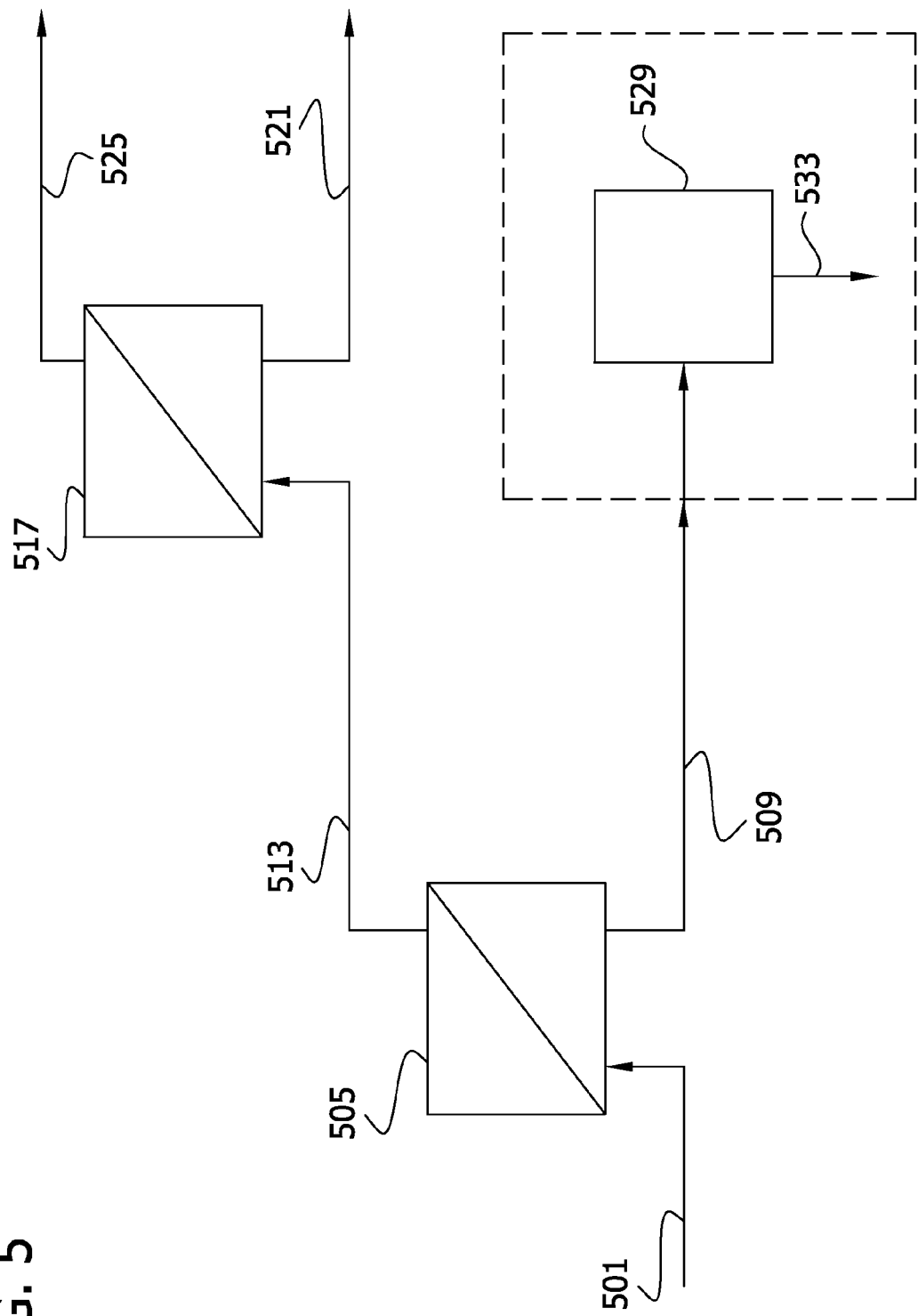
FIG. 5 is a flowsheet depicting a further embodiment of a process for recovery of glyphosate from an aqueous waste stream.

FIG. 5 depicts another embodiment of a process for recovery of glyphosate that may be utilized in conjunction with the phosphorus value—salt impurity recovery processes detailed elsewhere herein. As shown, an aqueous process stream 501 is introduced into a first membrane separation unit 505 containing a suitable separation membrane. Contacting the aqueous process stream 501 with the separation membrane forms a first retentate 509, which may be recovered as product, and a first permeate 513. First retentate 509 comprises glyphosate or a salt thereof and, more particularly, is typically enriched in glyphosate relative to first permeate 513. First permeate 513 is introduced into a second membrane separation unit 517 comprising a suitable separation membrane to form a second retentate 521 and a second permeate 525. Second retentate 521 is typically enriched in glyphosate or a salt thereof relative to second permeate 525. The feed stream of the phosphorus value—salt impurity recovery process (e.g., feed streams 1 and 101 shown in FIGS. 1 and 2, respectively) may comprise at least a portion of second retentate 521.

Again with reference to FIG. 5, first retentate 509 is optionally (as indicated by the dashed lines in FIG. 5) introduced into an ion exchange zone within an ion exchange column or unit 529 containing a bed of ion exchange resin. First retentate 509 is contacted with at least one ion exchange resin contained therein for selective removal of glyphosate therefrom to form an ion exchange zone effluent 533 depleted in glyphosate relative to first retenate 509. In accordance with various embodiments, the feed stream of the phosphorus value-salt impurity recovery process (e.g., feed streams 1 and 101 shown in FIGS. 1 and 2, respectively) may comprise at least a portion of ion exchange zone effluent 533.

In accordance with various preferred embodiments generally depicted in FIG. 5, the first membrane separation unit comprises a nanofiltration membrane. Further in accordance with such embodiments, the second membrane separation unit comprises a reverse osmosis membrane.

In various embodiments of the process depicted in FIG. 5, water is removed from first permeate 513 in an optional concentration operation (not shown) prior to its introduction into second membrane separation unit 517.

C. Recovery of PMIDA

As noted, various embodiments of the present invention are directed to recovery of phosphorus values and salt impurities from aqueous streams comprising one or more phospho-herbicide precursors. For example, various embodiments of the present invention are directed to recovery of PMIDA from aqueous process streams generated in the manufacture of glyphosate. It is to be understood that the processes described above in connection with FIGS. 3, 4, and 5 including membrane separation and/or ion exchange operations are suitable for recovery of PMIDA generally in accordance with the above discussion.

D. Glufosinate Production and Recovery

The processes of the present invention are likewise suitable for recovery of phosphorus values and salt impurities from aqueous waste streams generated in the manufacture of glufosinate. A variety of processes for preparation of glufosinate are known in the art. Many of these processes utilize phosphorus-containing compounds (e.g., $PCl_3$) and basic compounds (e.g., sodium hydroxide and/or potassium hydroxide). At least in part because these routes for the preparation of glufosinate typically utilize phosphorus trichloride, salt and phosphorus containing waste streams are typically generated. It is currently believed that various aqueous waste streams generated in the manufacture of glufosinate (e.g., the mother liquor resulting from preparation of glufosinate wet cake) include phosphorus and salt impurities that may be recovered by the processes of the present invention described above.

Various methods known in the art prepare glufosinate via routes that utilize phosphorus trichloride to form an ethyl vinylphosphinate precursor. The ethyl vinylphosphinate precursor is subjected to hydroformylation-aminocarbonylation, followed by hydrolysis to produce glufosinate.

In particular, one method of producing glufosinate generally comprises converting phosphorus trichloride to methylphosphonous dichloride or its derivatives. The methylphosphonous dichloride or derivatives may be reacted directly with methanol to form methyl methylphosphinate. Methyl methylphosphinate may then be reacted with vinylic compounds (e.g. vinyl acetate) to form an intermediate compound (e.g., acetoxyethyl)phosphinate). The resulting intermediate is pyrolyzed to prepare the requisite ethyl vinylphosphinate precursor. The ethyl vinylphosphinate precursor is subjected to hydroformylation-aminocarbonylation, followed by hydrolysis of the hydroformylation-aminocarbonylation product in the presence of hydrochloric acid to produce glufosinate.

Alternatively, another method of producing glufosinate generally comprises converting phosphorus trichloride to an adduct of methylphosphonous trichloride and aluminum tetrachloride (i.e., $CH_3PCl_3 \cdot AlCl_4$). The adduct may be reacted with ethylene to form an intermediate adduct, which then may be reacted with ethanol to form ethyl 1-(2-chloroethyl)-methylphosphinate. Ethyl 1-(2-chlroethyl)-methylphosphinate may then be reacted with potassium hydroxide and ethanol to prepare the requisite ethyl vinylphosphinate precursor. The ethyl vinylphosphinate precursor is subjected to hydroformylation-aminocarbonylation, followed by hydrolysis of the hydroformylation-aminocarbonylation product in the presence of hydrochloric acid to produce glufosinate.

E. Supercritical Treatment

Certain embodiments of the present invention are directed to processes for recovery of salt impurities, or salt values from aqueous waste streams generated in the manufacture of phospho-herbicides or precursors thereof that generally comprise subjecting the aqueous waste stream to temperature and pressure conditions sufficient to convert water in the aqueous waste stream into supercritical water. The aqueous waste streams treated in these embodiments typically comprise one or more salt impurities, one or more organophosphorus compounds, and various other organic compounds. In various preferred embodiments, the process is utilized for recovery of salt values from an aqueous process stream generated in the manufacture of glyphosate.

It is known that at extremely high temperatures and pressures, the liquid and gaseous phases of water and other fluids become indistinguishable. In water, the critical point occurs at around 647 K (374° C. or 705° F.) and 22.064 MPa (3200 psia or 218 atm). Under these supercritical temperature and pressure conditions, water becomes a dense gas having a density between that of water vapor and liquid water at standard conditions, and exhibiting unique properties. For example, solubility behavior is reversed in supercritical water causing salts to precipitate out of solution so that they can be handled and treated using conventional methods for solid-waste residuals. More generally, polar, ionic compounds are not soluble in supercritical water. Accordingly, converting water in the aqueous waste stream to supercritical water results in precipitation of various ionic components of the waste stream to form a particulate impurity product within the supercritical treatment reactor or vessel. For example, various salt impurities (e.g., sodium chloride) precipitate from the aqueous waste stream under supercritical conditions. Other ionic compounds present in the waste stream include salts of phospho-herbicides and precursors thereof, which also precipitate from the aqueous process stream under supercritical conditions. For example, in the case of aqueous waste streams generated in the manufacture of glyphosate, the aqueous process stream typically comprises one or more glyphosate salts and/or one or more salts of PMIDA. Thus, in accordance with salt recovery process embodiments of the present invention in which the aqueous waste stream is generated in the manufacture of glyphosate, a solid precipitate comprising salt impurities, salts of glyphosate, and/or salts of PMIDA is formed.

Precipitation and recovery of salts from the aqueous waste stream provides a purified, or treated waste stream generally depleted in salt impurities, and also typically depleted in organic phosphorus compounds relative to the composition of the aqueous waste stream.

In addition to the ionic components, the aqueous waste stream may comprise various non-ionic organic compounds. For example, in the case of aqueous waste streams generated in the manufacture of glyphosate, the aqueous waste stream typically comprises formaldehyde and/or formic acid. Removal of formaldehyde and formic acid from such aqueous waste streams typically comprises the catalyzed oxidation of formaldehyde to form formic acid, and the further oxidation of formic acid to carbon dioxide and water. It is currently believed that subjecting the aqueous waste stream to supercritical conditions results in oxidation of formaldehyde and/or formic acid impurities to carbon dioxide and water due to the presence of oxygen or other dissolved oxidizer in the aqueous waste stream. That is, conditions suitable for the oxidation of these non-ionic organic components generally prevail within the supercritical treatment reactor. Oxidation of these non-ionic components of the aqueous waste stream results in a purified aqueous waste stream depleted in such components relative to the aqueous waste stream.

Generally, the aqueous waste stream is introduced into a suitable reactor or vessel comprising a supercritical treatment zone within which the prevailing temperature and pressure conditions are at or above the supercritical temperature and pressure of water. The manner of operation of the reactor or vessel for subjecting the waste stream to supercritical treatment conditions is not narrowly critical. For example, in various embodiments, the supercritical treatment reactor is operated as a batch reactor, while in other embodiments the reactor is operated as a continuous reactor or vessel. An aqueous waste stream under ambient temperature and pressure may be introduced into a continuous supercritical treatment reactor using a suitable apparatus to overcome the pressure at the inlet to the vessel (e.g., a pump having sufficient operating pressure) and in a manner so as to not undermine the maintenance of supercritical conditions in the reactor. Additionally or alternatively, the pressure and/or temperature of the aqueous waste stream may be increased during one or more pretreatment stages prior to introduction into the supercritical treatment reactor to provide an aqueous waste stream under temperature and pressure conditions nearer the supercritical conditions.

Generally, the aqueous waste stream is subjected to temperature and pressure conditions within the supercritical treatment zone sufficient to form supercritical water. It is currently believed that the various solutes present in the aqueous waste stream may impact the supercritical temperature and/or pressure of the aqueous waste stream. If necessary, one skilled in the art can readily estimate or determine the impact of the solutes on the supercritical temperature and pressure to determine appropriate operating temperatures and pressures to be maintained in the supercritical treatment zone.

Regardless of the precise impact of solutes on supercritical temperature and/or pressure, typically the aqueous waste stream is subjected to temperature and pressure in excess of the supercritical temperature and pressure of water. Generally, the aqueous waste stream is subjected to a temperature of at least about 375° C., typically at least about 400° C. and, more typically, at least about 425° C. Generally, the aqueous waste stream is subjected to a pressure of at least about 22 MPa, typically at least about 25 MPa and, more typically, at least about 30 MPa.

The residence time of the aqueous waste stream within the supercritical treatment zone of the reactor (i.e., the time the aqueous waste stream is subjected to supercritical temperature and pressure conditions) is generally at least about 5 minutes, at least about 15 minutes, or at least about 30 minutes. Typically, the aqueous waste stream is subjected to supercritical temperature and pressure conditions for from about 5 to about 180 minutes, more typically for from about 15 to about 150 minutes and, still more typically, for from about 30 to about 120 minutes.

As noted, subjecting the waste stream to supercritical temperatures and pressures yields a mixture comprising precipitated salt crystals and a purified aqueous waste stream. Further, in accordance with the present invention, precipitated salt crystals may be recovered from this mixture. For example, to facilitate recovery of precipitated salt crystals, the supercritical treatment reactor may have a tapered, or cone-shaped bottom to facilitate gravity separation and collection of precipitated salt crystals. Additionally or alternatively, precipitated salt crystals may be recovered from this mixture using methods generally known in the art, e.g., centrifugation, filtration, etc.

The recovered salt crystals may be disposed of in accordance with various methods known in the art including, for example, introduction into a landfill. Additionally or alternatively, precipitated salt crystals may be utilized in any of the processes for recovery of salt impurities and phosphorus values detailed elsewhere herein. In various embodiments, the precipitated salt crystals are recovered in the form of a slurry suitable for use in the phosphorus value—salt impurity recovery processes of the present invention. However, if necessary, the precipitated salt crystals may be slurried in a suitable aqueous medium, for example to facilitate further processing (e.g., pumping).

Since salt impurities have been removed from the aqueous waste stream by precipitation, the purified aqueous waste stream is typically depleted in salt impurities relative to the aqueous waste stream subjected to supercritical conditions. In addition, based on the oxidative conditions to which the waste stream is subjected, the purified waste stream is likewise typically depleted in non-ionic organic components relative to the aqueous waste stream. Generally, recovery of the purified aqueous waste stream comprises venting of the vessel, or reactor. In view of the relatively high temperatures and pressures within the vessel, preferably purified aqueous waste stream is recovered from the reactor utilizing a multi-stage process in which the pressure and temperatures are lowered in a step-wise manner by passage of the purified aqueous waste stream through suitable apparatus (e.g., one or more heat exchangers). Further in accordance with various preferred embodiments, the heat (i.e., energy) recovered during one or more of the multiple recovery stages may be utilized in heating and/or pressurizing the aqueous waste stream prior to its introduction into the vessel.

In various preferred embodiments, the recovered purified aqueous waste stream is in the form of a relatively pure aqueous waste stream suitable for disposal or use as process water without any treatment. For example, the purified aqueous waste stream may be used as process water in the salt recovery process detailed herein, in phosphorus value—salt impurity recovery processes of the present invention, or elsewhere in the manufacture of phospho-herbicides. Various conventional processes for manufacture of phospho-herbicides subject recovered mother liquor to biological treatment to provide an aqueous waste stream suitable for disposal. The purified aqueous waste stream may likewise be subjected to such treatment, but it is currently believed that the biological treatment may be operated at a higher throughput based on the relatively low impurity content of the aqueous waste stream.

PMIDA or a salt thereof recovered in accordance with the recovery processes detailed herein may be converted to glyphosate or a salt thereof in accordance with methods known in the art as described, for example, in U.S. Pat. No. 6,417,133 to Ebner et al.; U.S. Pat. No. 7,129,373 to Coleman et al.; U.S. Pat. No. 7,015,351 to Haupfear et al.; Wan et al. International Publication No. WO 2006/031938; Liu et al. International Publication No. WO 2005/016519; and Arhancet et al. International Publication No. WO 2006/089193; the entire contents of which are incorporated herein by reference for all relevant purposes. Further in accordance with the present invention, precursors of PMIDA recovered by any of the processes detailed herein may be utilized in processes for preparation of glyphosate. For example, IDA recovered in accordance with the present invention may be utilized to prepare PMIDA or a salt thereof in accordance with methods known in the art as described, for example, in U.S. Pat. No. 7,329,778, the entire contents of which are incorporated herein by reference for all relevant purposes. The PMIDA or a salt thereof may be converted to glyphosate or a salt thereof in accordance with the methods noted above.

Having described the invention in detail, it will be apparent that modifications and variations are possible without departing from the scope of the invention defined in the appended claims.

EXAMPLES

The following examples are included to demonstrate preferred embodiments of the invention. It will be appreciated by those of skill in the art that the techniques disclosed in the following examples represent techniques discovered by applicants to function well in the practice of the invention, and thus can be considered to constitute preferred modes for its practice. However, those of skill in the art should, in light of the instant disclosure, also appreciate that many changes can be made in the specific embodiments that are disclosed, while still obtaining like or similar results, without departing from the scope of the invention. Thus, the examples are exemplary only and should not be construed to limit the invention in any way. To the extent necessary to enable and describe the instant invention, all references cited are herein incorporated by reference.

Example 1

Calcination of a Test Solution Representing Glyphosate Mother Liquor Under Acidic Conditions This Example details calcination experiments utilizing a test solution representing acidic mother liquor formed during glyphosate manufacture. The experiments were undertaken to determine the effectiveness of calcination of the waste stream for conversion of organophosphorus compounds and inorganic salts to solids comprising phosphate, pyrophosphate, and inorganic salts (e.g., sodium chloride).

The test solutions were prepared by combining mother liquor solutions derived from crystallization of a product mixture generated during laboratory scale glyphosate production with other components to provide a target solution composition. The aqueous test solutions generally contained about 2 wt. % glyphosate, about 1 wt. % glycine, about 10 wt. % sodium chloride, phosphorous acid, and various other impurities (e.g., glyphosine, NMG, HMPA, AMPA, PMIDA). The pH of the test solution was approximately 2.0. The composition of the test solution is set forth in Table 0.

TABLE 0

| | | |
|---|---|---|
| PMIDA | wt % | 0.19 |
| Glyphosate | wt % | 1.97 |
| IDA | wt % | 0.65 |
| FM | ppm | 143 |
| FA | ppm | 224 |
| Iminobis | ppm | 2655 |
| NMG | ppm | 17419 |
| $PO_4$ | ppm | 11584 |
| NFG | ppm | 1072 |
| AMPA | ppm | 5305 |
| Glycine | ppm | 3429 |
| MAMPA | ppm | 3371 |
| Chloride | ppm | 115656 |
| $H_3PO_3$ | ppm | 10176 |

FM = formaldehyde
FA = formic acid

The experiments were conducted using a laboratory calcination/combustion system generally depicted in FIG. 2. Feed device 105 included a peristaltic pump and a stainless steel feeding tube for introduction of feed into combustion chamber 113. The tube of feed device 105 was in contact with an open flame within combustion chamber 113. Combustion chamber 113 was in the form of a stainless steel tank having a capacity of 1000 ml and a lip around the chamber to aid in retention of the solid and formation of a solid bed. The open flame within the combustion chamber was supplied by a natural gas torch positioned within the combustion chamber. For heating of the combustion chamber, two Fisher burners (not shown in FIG. 2) were placed under the combustion chamber and the combustion chamber was rotated over the burners by a shaft and motor arrangement (also not shown in FIG. 2) attached to the combustion chamber.

To conduct the experiments sodium chloride crystals (approx. 40 g) were charged into the combustion chamber to serve as a solids bed, and aqueous test solution (approx. 40 g) was added to the solids bed.

The initial temperature of the combustion chamber was approximately 90-150° C., and the temperature of the combustion chamber was slowly raised until stabilized at approximately 750° C. Air was fed into the combustion chamber at a rate of approximately 1 mL/min. After 10 minutes of heating the initial sample, additional test solution (approx. 40 g) was introduced into the combustion chamber. After the second addition of test solution, the temperature inside the chamber was maintained above 750° C. (e.g., at approx. 800° C.) for approximately 5 minutes. During heating of the initial test solution and the combined test solution, rotation of the combustion chamber was controlled at from approximately 10 to 20 revolutions per minute (rpm). The solids remaining in the chamber were collected for analysis.

High performance liquid chromatography (HPLC), $^{31}P$ Nuclear Magnetic Resonance (NMR), chloride titrations, and Total Organic Carbon (TOC) analyses were employed to analyze the recovered solids. The results of the $^{31}P$ NMR analysis indicated only the presence of phosphate and pyrophosphate, but no organophosphorus compounds were identified. The results are shown in Table 1.

TABLE 1

Analytical Results for Solid

| $P_2O_7^{4-}$ (wt %) | $PO_4^{3-}$ (wt %) | Total Cl⁻ (wt %) | Total insoluble (wt %) | Total Organic Content (TOC) (ppm) | Total Nitrogen Content (ppm) |
|---|---|---|---|---|---|
| 0.75% | 0.29% | 58.61% | 1.54% | 346 | 13 |

These results indicate that calcination of the aqueous test solution is suitable for recovery of inorganic compounds from the test solution containing organophosphorus compounds and inorganic salts.

Example 2

Direct Combustion of a Test Solution Representing Glyphosate Mother Liquor Under Acidic Conditions This Example details direct combustion experiments of an aqueous test solution prepared as described in Example 1.

Sodium chloride crystals (approx. 67.4 g) were introduced into the combustion chamber as a solids bed and test solution (approx. 40 g) was introduced into the solids bed. The temperature within the combustion chamber was increased until it reached at least approx. 750° C.

Additional test solution was introduced into the combustion chamber through a stainless steel nozzle. The outlet of the nozzle was positioned directly above the flame of a propane torch within the combustion chamber. Test solution was introduced into the combustion chamber at a rate of approximately 25 mL/min. Controlling the rate of air flow and solution feed rate avoided accumulation of water from the test solution passing through the flame collecting on the solids bed. A total of approx. 288.58 g of the test solution was introduced into the combustion chamber at an approximately constant feeding rate (24.88 mL/min). During introduction of the test solution into the flame, the temperature within the combustion chamber was maintained at approximately 800° C. The combustion chamber was allowed to cool to room temperature and the solids were recovered for analysis. The results are shown in Table 2. These results indicate the presence of phosphate and pyrophosphate species, but no organophosphorus compounds were identified.

TABLE 2

Analytical Results for Solid

| $P_2O_7^{4-}$ (wt %) | $PO_4^{3-}$ (wt %) | Total Cl⁻ (wt %) | Total insoluble (wt %) | Total Organic Content (ppm) | Total Nitrogen Content (ppm) |
|---|---|---|---|---|---|
| 3.77% | 0.95% | 55.65% | 1.02% | 17 | 4 |

Example 3

Phosphoric Acid Recovery via Liquid-Liquid Extractions from a Test Solution Representing Sodium Chloride-Depleted Glyphosate Mother Liquor This example details liquid-liquid extraction for recovery of phosphate ions from a solution that may be prepared by calcination of a test solution as described in Example 1. The test solution contained approximately 73 wt. % $PO_4^{3-}$ ions and approximately 3 wt. % sodium chloride, balance water.

Test solution (approx. 50 g) and an organic solvent mixture (approx. 100 g) of tributyl phosphate/isopropyl ether (15 wt. %/85 wt. %) were mixed in a beaker. Phase separation occurred after mixing for approximately 30 minutes; the organic layer was separated from the aqueous phase by a separation funnel. The organic layer contained about 14.5 wt. % $PO_4^{3-}$. To this organic layer (117.8 g), water (approx. 12.75 g) was added and mixed for 15 minutes. After phase separation, the aqueous phase was separated and analyzed by HPLC. The aqueous phase contained approx. 46 wt. % $PO_4^{3-}$. The phosphate content of the recovered aqueous phase represented a phosphate recovery of approximately 35%.

Table 2A lists the starting composition of the solution and compositions of the resulting phases.

TABLE 2A

| Component | Centrifuge Moth. Liq. (wt. and/or conc. of component) | Organic Solvent (wt. and/or conc. of component) | Aqueous Raffinate (wt. and/or conc. of component) | Pregnant Organic Phase (wt. and/or conc. of component)[a] | % Fraction of Cent. Moth. Liquor Components in Raffinate |
|---|---|---|---|---|---|
| $PO_3^{-3}$ | 0.10 g (0.2%) | 0 | 0.05 g (0.16%) | 0.05 g (0.04%) | 50.0 |
| $PO_4^{-3}$ | 35.98 g (73.9%) | 0 | 18.94 g (63.3%) | 17.04 g (14.5%) | 52.6 |
| Chloride | 0.67 g (1.4%) | 0 | 0.36 g (1.2%) | 0.31 g (0.3%) | 53.7 |
| Sodium | 0.47 g (1.0%) | 0 | 0.46 g (1.5%) | 0.01 g (0.008%) | 97.9 |
| Aluminum | 172 ppm | 0 | 279 ppm | <1 ppm | >99 |
| Arsenic | 83 ppm | 0 | 62 ppm | 19 ppm | 46 |
| Chromium | 98 ppm | 0 | 144 ppm | 4 ppm | 90 |
| Copper | 78 ppm | 0 | 99 ppm | 7 ppm | 78 |
| Iron | 127 ppm | 0 | 102 ppm | 27 ppm | 49 |
| Manganese | 81 ppm | 0 | 129 ppm | <1 ppm | >98 |
| Zinc | 79 ppm | 0 | 10 ppm | 30 ppm | 8 |
| Nickel | 77 ppm | 0 | 120 ppm | 1 ppm | 96 |
| (n-Bu)$_3$PO | 0 | 14.8 g (15%) | 0[b] | 17.8 g (12.6%) | 0 |
| (i-Pr)$_2$O | 0 | 84.15 g (85%) | 0[b] | 84.1 g (71.4%) | 0 |
| Total | 48.66 g | 99.0 g | 29.91 g | 117.8 g | N/A[c] |

[a]Value for each component obtained by subtracting the component weight in the raffinate from the component weight in the centrifuge mother liquor.
[b]No entrainment of organic solvent in aqueous phase is assumed.
[c]N/A = not applicable Laboratory Membrane Evaluation System Experiments were undertaken to determine the suitability of membrane separation techniques in connection with solids-depleted crystallizer mother liquor solutions containing N-(phosphonomethyl)glycine, inorganic monovalent and divalent salts, and various impurities, and at varying pHs.

Figure 6:
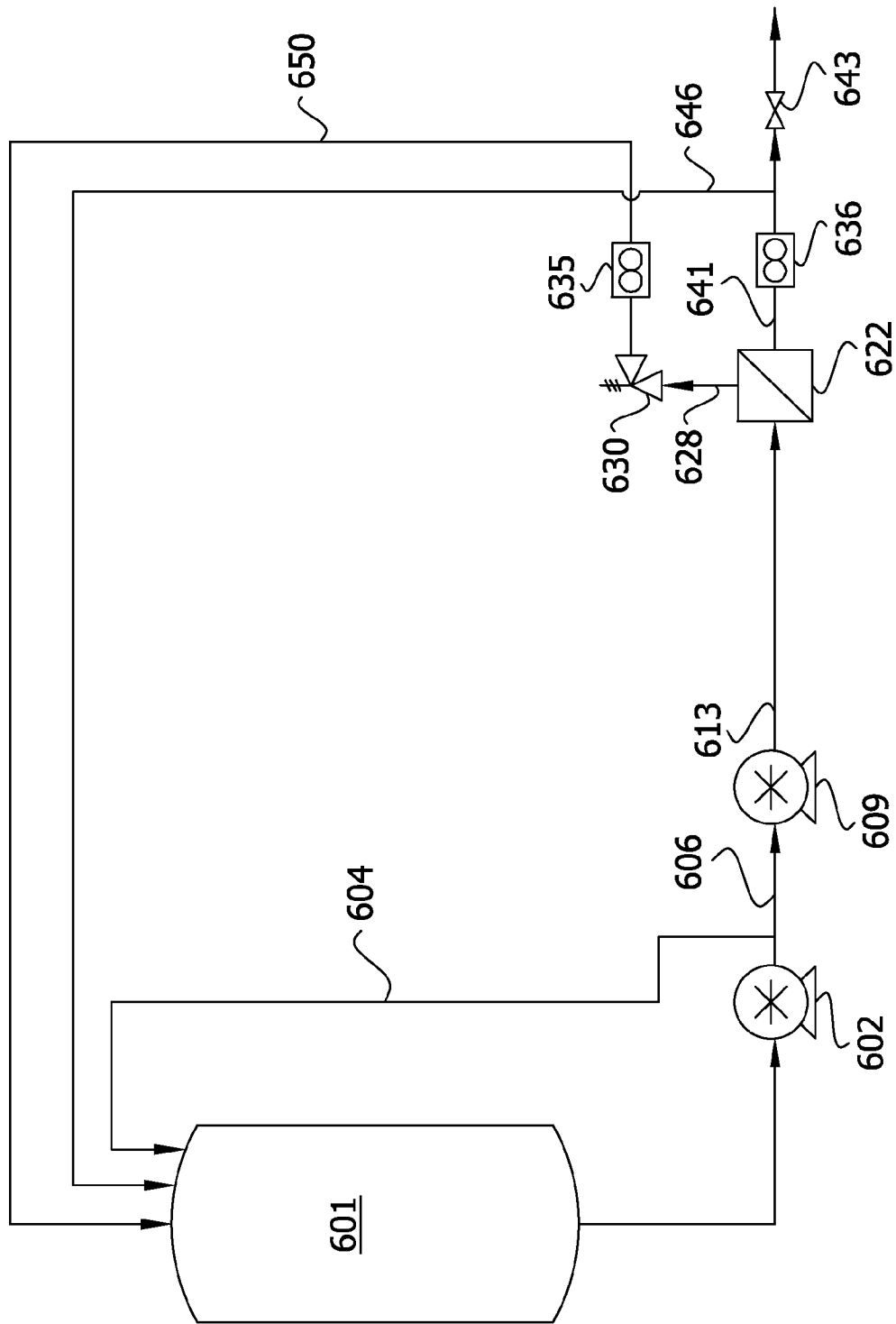
FIG. 6 is a flowsheet depicting a laboratory evaluation system utilized as set forth in Examples 4-6.

Laboratory membrane separation experiments were conducted using a setup shown schematically in FIG. 6, which allowed for the processing of the test solutions at a variety of pH conditions. The laboratory evaluation system included a test solution feed vessel 601, two pumps 602 and 609, a membrane separation unit 622, and various process control equipment including valves, pressure indicators, and temperature controllers.

The first pump 602 was a small centrifugal pump that was used as a booster pump. Booster pump 602 served two purposes. Primarily, the booster pump provided a pressurized test solution feed stream 606 for high pressure pump 609. The booster pump also recycled a portion 604 of the test solution feed it removed from feed vessel 601 back to the feed vessel. This provided mixing of the contents of feed vessel 601. Feed vessel 601 was also equipped with an internal steam heating coil (not shown) that was used to keep the contents of the feed vessel at a given set point temperature.

Pressurized test solution feed stream 606 from booster pump 602 was pressurized further by high pressure positive displacement pump 609 (Wanner diaphragm pump) that was capable of generating approximately 15.1 liters/min at 6996 kPa. A variable speed drive was installed on the pump drive to allow for feed flow rate control. High pressure pump 609 was used to send a highly pressurized test solution feed stream 613 on to membrane separation unit 622.

Bench-scale spiral-wound membranes were tested in the laboratory evaluation system. The operating pressure of the membrane separation unit was controlled by a throttle valve 630 positioned on the outlet from which retentate 628 was withdrawn from membrane separation unit 622. The operating pressures varied from about 3500 to about 6000 kPa absolute, while the target operating pH was varied from a pH of about 1.5 to a pH of about 10.0.

In all laboratory membrane separation experiments, retentate 628 was recycled to feed vessel 601 after it exited the housing of membrane separation unit 622 in retentate recycle stream 650. The retentate passed through a flow meter 635 that provided for monitoring of the retentate flow rate. The permeate 641 exiting the housing of membrane separation unit 622 was also passed through a flow meter 636 that provided for monitoring of the permeate flow rate.

The permeate 641 could be diverted to a waste stream 643 or recycled to feed vessel 601 in permeate recycle stream 646 depending upon the type of experiment conducted. During operation in "recycle" mode, the permeate was recycled to feed vessel 601 along with the retentate to provide a constant test solution composition throughout the experiment. This mode of operation may be used to generate data regarding the stability of membrane flux and rejection characteristics. During a "batch concentration" experiment, the permeate would be diverted to waste, while the retentate was recycled to the feed vessel 601. This type of experiment allowed for the evaluation of membrane flux and rejection characteristics while the concentration of components, such as N-(phosphonomethyl)glycine and inorganic salts, in the test solution feed was increasing.

High performance liquid chromatography (HPLC) was employed to analyze the process streams associated with the membrane separation experiments. A performance indicator known as a solute rejection characteristic was calculated for each of the components of the test solution using the data from the HPLC analysis. Solute rejection was defined as the difference between one and the ratio of permeate concentration (Cp) for a component to the average of the process stream (Cs) and retentate concentration (Cr): $1-Cp/((Cs+Cr)/2)$.

Example 4

Purification of a Test Solution with a Nanofiltration Membrane Under Acidic Conditions (Diafiltration)

This example illustrates experiments conducted utilizing spiral-wound membranes to assess the performance of a nanofiltration membrane to effectively purify a test solution under acidic conditions when the separation membrane is operated as a diafiltration membrane.

The performance of a polyamide thin-film based nanofiltration membrane with a nominal molecular weight cut off (MWCO) of 250 daltons available from GE Osmonics was evaluated for use in connection with a test solution having a pH of approximately 1.7. The test solution flow rate was maintained at approximately 11.4 liters per minute, the operating temperature was maintained at about 40° C., and the operating pressure was maintained at about 4826 kPa.

The test solution contained approx. 2 wt. % N-(phosphonomethyl)glycine, approx. 1 wt. % glycine, approx. 9 wt. % triethylamine hydrochloride and approx. 3 wt. % hydrochloric acid. The test solution also contained other low level impurities typically seen in the process, such as glyphosine, NMG, HMPA, AMPA, PMIDA, and phosphorous acid. Approximately 19.6 kg of the above-described material was diluted with approximately 39 kg of deionized water to simulate operation of the separation membrane as a diafiltration membrane.

The experiment was generally conducted in batch-concentration mode, wherein the retentate was continually recycled to the feed vessel while the permeate was removed from the system and collected in a separate vessel. However, prior to removal of each portion of the permeate (shown in Table 3 as percentage of initial test solution mass) the experiment was conducted in recycle mode to stabilize the system. Feed, retentate, and permeate samples were collected throughout the experiment as permeate was removed from the process. The results are reported in Table 3 below.

TABLE 3

Experimental Testing to Assess Performance of a GE Osmonics Nanofiltration Membrane to Purify a Test Solution under Acidic Conditions (Diafiltration)

| Permeate Removed as Percentage of Initial Test Solution Mass (%) | Permeate Flux (Gallons per ft² of membrane surface area per day) | Rejection Characteristic - Chloride Ions (%) | Chloride Ions Remaining in Test Solution (%) |
|---|---|---|---|
| 0 | 20.4 | 46.1 | 100.0 |
| 12 | 18.6 | 45.1 | 93.0 |
| 24 | 17.4 | 46.9 | 85.3 |
| 37 | 15.6 | 47.0 | 76.7 |
| 48 | 12.6 | 45.8 | 68.5 |
| 70 | 6.0 | 39.6 | 48.5 |

As shown in Table 3, chloride ions can be effectively removed from the test solution under acidic conditions when diafiltration is employed. In addition to evaluating membrane performance to separate chloride ions from the test solution, it was also important to evaluate membrane performance with regard to retention of glyphosate. Table 4 reports glyphosate retention results.

TABLE 4

Experimental Testing to Assess Performance of a GE Osmonics Nanofiltration Membrane to Purify a Test Solution under Acidic Conditions when Using Diafiltration

| Permeate Removed as Percentage of Initial Test Solution Mass (%) | Rejection Characteristic - glyphosate (%) | Glyphosate Ions Remaining in Test Solution (%) |
|---|---|---|
| 0 | 94.0 | 100.0 |
| 12 | 94.3 | 99.2 |
| 24 | 94.3 | 98.2 |
| 37 | 94.2 | 97.1 |
| 48 | 94.0 | 95.8 |
| 70 | 91.2 | 91.3 |

As shown in Table 4, glyphosate was effectively retained under acidic conditions when diafiltration is employed. For example, after passage of 70% of the initial test solution mass through the membrane, greater than 90 wt. % of glyphosate originally in the test solution was found in the retentate while more than 50 wt. % of the chloride ions was found in the permeate.

Example 5

Impact of Varying Alkaline Conditions on Performance of a Nanofiltration Membrane This example illustrates experiments conducted utilizing spiral-wound nanofiltration membranes to determine the impact of varying alkaline conditions when contacting a test solution with a nanofiltration membrane.

A polyamide thin-film based nanofiltration membrane with a nominal molecular weight cut off (MWCO) of 250 daltons available from GE Osmonics was utilized in recycle mode to evaluate the impact of varying pH, under alkaline conditions, on the performance of a nanofiltration membrane when contacting a test solution.

The test solution (pH 7.0) was prepared to meet the general compositional profiles in the process. The synthetic solution typically contained about 2 wt. % N-(phosphonomethyl)glycine, about 1 wt. % glycine, and about 10 wt. % sodium chloride. Other low level impurities typically seen in the process, such as glyphosine, NMG, HMPA, AMPA, PMIDA and phosphorous acid were also presented. The composition of the solution is set forth in Table 4A.

TABLE 4A

| Components | wt. % |
|---|---|
| Glyphosate | 1.64% |
| NaCl | 9.07% |
| Glycine | 0.89% |
| Glyphosine | 0.49% |
| Dimethyl phosphite | 0.51% |
| $H_3PO_3$ | 0.32% |
| $H_3PO_4$ | 0.40% |
| NMG | 0.40% |
| FM | 0.01% |
| FA | 0.23% |
| $Na_2SO_4$ | 0.16% |
| PMIDA | 0.83% |
| MAMPA | 0.04% |
| IDA | 0.43% |
| HMPA | 0.43% |
| AMPA | 0.05% |
| NFG | 0.01% |

The operating temperature was maintained at approximately 30° C., and the test solution flow rate to the membrane system was maintained at approximately 11.4 liters per minute. The operating pressure was varied from about 3392 kPa to about 5515 kPa. The pH of the test solution was varied from a pH of approx. 6.9 to a pH of approx. 10.2, by addition of concentrated NaOH as necessary. Feed, retentate, and permeate samples were collected at different pressures and pHs. HPLC results for the analyzed samples are provided in Table 5 below.

TABLE 5

Impact of Varying Alkaline Conditions on Performance of a GE Osmonics Nanofiltration Membrane in Laboratory Evaluation System when Contacted with Test Solution

| Approximate pH of Test Solution | Observed Rejection Characteristic - Glyphosate (%) | Observed Rejection Characteristic - Chloride ions (%) | Observed Permeate Flux near 3447 kPa (Gallons per $ft^2$ of membrane surface area per day) |
|---|---|---|---|
| 6.9 | 96.9 | 30.7 | 3.7 |
| 8.1 | 98.7 | 17.2 | 10.5 |
| 9.2 | 99.0 | 1.3 | 15.6 |
| 10.2 | 98.6 | −10.1 | 24.0 |

As shown in Table 5, the pH of the test solution impacts the observed rejection characteristics and the permeate flux demonstrated by the nanofiltration membrane.

Example 6

Purification of a Test Solution with a Nanofiltration Membrane Under Alkaline Conditions when Using Diafiltration This example illustrates experiments conducted utilizing spiral-wound membranes to assess the performance of a nanofiltration membrane to effectively purify a test solution when contacting a test solution under alkaline conditions when using diafiltration.

The performance of a polyamide thin-film based nanofiltration membrane with a nominal molecular weight cut off (MWCO) of 250 daltons available from GE Osmonics was evaluated as the pH of the test solution was approximately 9.0. The test solution flow rate was maintained at approximately 11.4 liters per minute, the operating temperature was maintained at about 20° C., and the operating pressure was maintained at about 4826 kPa.

The test solution utilized in this example is similar to the test solution that was utilized in Example 5, except that it was combined with equal amounts of deionized water to simulate diafiltration operation. The experiment was conducted in batch-concentration mode, wherein the retentate was continually recycled to the feed vessel while the permeate was removed from the system and collected in a separate vessel. As noted above in connection with Example 4, prior to removal of each portion of permeate the system was operated in recycle mode for stabilization of the system. Feed, retentate, and permeate samples were collected throughout the experiment as permeate was removed from the process. The results are reported in Table 6 below.

TABLE 6

Experimental Testing to Assess Performance of a GE Osmonics Nanofiltration Membrane to Purify a Test Solution under Acidic Conditions when Using Diafiltration

| Permeate Removed as Percentage of Initial Test Solution Mass (%) | Permeate Flux (Gallons per $ft^2$ of membrane surface area per day) | Glyphosate Remaining in Test Solution (%) | Chloride Ions Remaining in Test Solution (%) |
|---|---|---|---|
| 0 | 28.8 | 100.0 | 100.0 |
| 12 | 27.6 | 99.3 | 87.7 |
| 23 | 27.6 | 98.4 | 75.1 |
| 35 | 25.8 | 97.4 | 62.6 |
| 46 | 24.0 | 96.2 | 51.0 |
| 55 | 22.2 | 94.8 | 40.3 |
| 62 | 20.4 | 93.7 | 33.3 |
| 70 | 16.8 | 91.7 | 24.0 |
| 77 | 13.8 | 89.1 | 16.6 |
| 84 | 9.6 | 83.7 | 8.8 |

As shown in Table 6, a nanofiltration membrane can be used to sufficiently remove a substantial portion of the chloride ions in a test solution when operated in diafiltration mode under alkaline conditions. Additionally, a nanofiltration membrane can also retain a significant portion of the N-(phosphonomethyl)glycine present in a test solution under said conditions.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above without departing from the scope of the invention, it is intended that all matter contained in the above description and shown in the accompanying drawings shall be interpreted as illustrative and not in a limiting sense.

What is claimed is:
1. A process for recovery of phosphorus values and salt impurities from an aqueous waste stream comprising one or more organic phosphorus compounds and salt impurities, the process comprising:
oxidizing one or more organic phosphorus compounds containing phosphorus and organic carbon present in a feed stream comprising components of the aqueous waste stream to produce a phosphate-containing cake, wherein the one or more organic phosphorus compounds are selected from the group consisting of N-(phosphonomethyl)glycine (glyphosate) and salts thereof, N-(phosphonomethyl)iminodiacetic acid (PMIDA) and salts thereof, aminomethylphosphonic acid and salts thereof, hydroxymethylphosphonic acid and salts thereof, N-formyl-N-(phosphonomethyl)glycine and salts thereof, N-methyl-N-(phosphonomethyl) glycine and salts thereof, methyl aminomethylphosphonic acid and salts thereof, and combinations thereof, and wherein the oxidizing one or more organic phosphorus compounds within the feed stream and containing phosphorus and organic carbon comprises calcination of the feed stream and/or combustion of the one or more compounds within the feed stream and containing phosphorus and organic carbon, wherein any combustion of the one or more compounds containing phosphorus and organic carbon is conducted at a temperature of at least about 500° C.;

contacting within an acidification zone the phosphate-containing cake and an acidic liquid medium to form a solution comprising at least one inorganic salt and phosphoric acid; and precipitating salt crystals from the salt-containing solution to form an aqueous product mixture comprising salt crystals and a mother liquor comprising phosphoric acid.

2. The process of claim 1 wherein the one or more organic phosphorus compounds are selected from the group consisting of glyphosate and salts thereof, PMIDA and salts thereof, and combinations thereof.

3. The process of claim 1 wherein the one or more organic phosphorus compounds comprise glyphosate and salts thereof.

4. The process of claim 1 wherein the one or more organic phosphorus compounds comprise PMIDA and salts thereof.

5. The process as set forth in claim 1 further comprising concentrating the aqueous waste steam to form at least a portion of the feed stream comprising components of the aqueous waste stream.

6. The process as set forth in claim 5 wherein concentrating the aqueous waste stream comprises removing water from the aqueous waste stream.

7. The process as set forth in claim 6 wherein removing water from the aqueous waste stream comprises heating the aqueous waste stream.

8. The process as set forth in claim 5 wherein concentrating the aqueous waste stream produces an overheads stream comprising organic impurities selected from formic acid, formaldehyde, or combinations thereof removed from the aqueous waste stream.

9. The process as set forth in claim 5 wherein concentrating the aqueous waste stream comprises contacting the aqueous waste stream and a membrane to produce a retentate enriched in organic phosphorus compounds and a permeate comprising water, and the feed stream comprises at least a portion of the retentate.

10. The process as set forth in claim 9 wherein the permeate is enriched in organic impurities selected from the group consisting of formic acid, formaldehyde, or a combination thereof relative to the retentate.

11. The process as set forth in claim 1 wherein oxidizing one or more compounds containing phosphorus and organic carbon comprises heating the feed steam by contact with an oxygen-containing gas stream.

12. The process as set forth in claim 11 wherein heating the feed stream and oxidizing organic carbon removes organic impurities selected from the group consisting of formic acid, formaldehyde, or a combination thereof from the feed stream.

13. The process as set forth in claim 11 wherein the aqueous waste stream comprises glyphosate or a salt thereof, the process further comprising recovering glyphosate from the aqueous waste stream prior to oxidizing one or more compounds containing phosphorus and organic carbon present in the feed stream comprising components of the aqueous waste stream.

14. The process as set forth in claim 13 wherein glyphosate is recovered from the aqueous waste stream by evaporative crystallization, membrane separation, and/or ion exchange.

15. The process as set forth in claim 11 wherein the aqueous waste stream is generated in a process for the manufacture of N-(phosphonomethyl)glycine or a derivative thereof comprising oxidizing N-(phosphonomethyl)iminodiacetic acid or a salt thereof in an aqueous reaction medium in the presence of an oxidation catalyst.

16. The process as set forth in claim 11 wherein the aqueous waste stream is generated in a process for the manufacture of N-(phosphonomethyl)glycine or a derivative thereof comprising reacting glycine and dimethylphosphite.

17. The process as set forth in claim 11 wherein the aqueous waste stream comprises one or more precursors of N-(phosphonomethyl)glycine, the process further comprising recovering the one or more precursors from the aqueous waste stream prior to oxidizing one or more compounds containing phosphorus and organic carbon present in the feed stream comprising components of the aqueous waste stream.

18. The process as set forth in claim 17 wherein the one or more precursors comprise N-(phosphonomethyl)iminodiacetic acid, iminodiacetic acid, or a combination thereof.

19. The process as set forth in claim 17 wherein the one or more precursors are recovered by evaporative crystallization, membrane separation, and/or ion exchange.

20. The process as set forth in claim 17 further comprising preparing N-(phosphonomethyl)glycine or a salt thereof.

21. The process as set forth in claim 20 wherein N-(phosphonomethyl)iminodiacetic or a salt thereof is converted to N-(phosphonomethyl)glycine or a salt thereof.

22. The process as set forth in claim 18 wherein iminodiacetic acid is utilized in a process for the preparation of N-(phosphonomethyl)iminodiacetic acid or a salt thereof, and the N-(phosphonomethyl)iminodiacetic or a salt thereof is converted to N-(phosphonomethyl)glycine or a salt thereof.

23. The process of claim 1 wherein the oxidizing one or more organic phosphorus compounds containing phosphorus and organic carbon comprises calcination of the feed stream.

24. The process of claim 1 wherein the oxidizing one or more organic phosphorus compounds containing phosphorus and organic carbon comprises combustion of at least a portion of the one or more compounds containing phosphorus and organic carbon at a combustion temperature of at least about 500° C.

* * * * *